US012792139B1

(12) United States Patent
Canberk et al.

(10) Patent No.: US 12,792,139 B1
(45) Date of Patent: Nov. 10, 2026

(54) POSTURE NOTIFICATION FOR AUGMENTED REALITY DEVICES

(71) Applicant: Snap Inc., Santa Monica, CA (US)

(72) Inventors: Ilteris Kaan Canberk, Los Angeles, CA (US); Mitchell Kuppersmith, Los Angeles, CA (US); Steven Le, Santa Monica, CA (US); Atley Loughridge, Culver City, CA (US); Daria Skrypnyk, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/332,859

(22) Filed: Sep. 18, 2025

(51) Int. Cl.
*G06F 3/01* (2006.01)
*G02B 27/00* (2006.01)
*G02B 27/01* (2006.01)

(52) U.S. Cl.
CPC ......... *G06F 3/012* (2013.01); *G02B 27/0093* (2013.01); *G02B 27/0172* (2013.01); *G06F 3/017* (2013.01); *G02B 2027/014* (2013.01); *G02B 2027/0178* (2013.01)

(58) Field of Classification Search
None
See application file for complete search history.

(56) References Cited

U.S. PATENT DOCUMENTS 10,043,066 B2 * 8/2018 Lawrence .............. H04N 7/147
10,839,576 B2 * 11/2020 Hoover .............. G02B 27/0081
11,367,230 B2 * 6/2022 Hoover .............. G02B 27/0081
12,100,080 B2 * 9/2024 Hoover .............. G02B 27/0081
12,293,017 B2 * 5/2025 Clausen .................. G06F 3/012
2024/0321141 A1 * 9/2024 van Nierop .......... G09B 23/285
2024/0386643 A1 * 11/2024 Hoover .............. G02B 27/0081
2025/0110612 A1 * 4/2025 Weber ..................... G06F 3/013
2025/0216939 A1 * 7/2025 Kang ...................... G06F 3/013
2025/0334797 A1 * 10/2025 Jung .................. G02B 27/0093

OTHER PUBLICATIONS

"Bad Posture Habits Lead to a Decrease in Productivity", EHS Today, [Online]. Retrieved from the Internet: <URL: https://www.ehstoday.com/health/article/21918319/bad-posture-habits-lead-to-a-decrease-in-productivity>, (Jan. 26, 2017), 7 pgs.
"Chronic Back Pain Treatments Bergen County NJ", MedWell, [Online]. Retrieved from the Internet: <URL: https://www.medwellnj.com/treatments/back-pain/#:~:text=Chronic%20Back%20Pain%20Treatments%20Bergen%20County%20NJ,pain%20at%20some%20point%20in%20their%20lives>, (Retrieved on Sep. 17, 2025), 6 pgs.
"Upright Posture Corrector", [Online]. Retrieved from the Internet: <URL: https://www.uprightpose.com>, (Retrieved on Sep. 17, 2025), 11 pgs.

* cited by examiner

*Primary Examiner* — Fred Tzeng
(74) *Attorney, Agent, or Firm* — Schwegman Lundberg & Woessner, P.A.

(57) ABSTRACT

A system monitors the position of an augmented reality (AR) wearable device worn by a user to detect improper posture. The system establishes a calibration point based on the reference position of the wearable device, and then tracks the user's head position relative to the calibration point in real-time. If the head position deviates from the reference position by more than a predetermined threshold for a specified duration, the system detects improper posture and stores associated data.

20 Claims, 10 Drawing Sheets

POSTURE NOTIFICATION FOR AUGMENTED REALITY DEVICES

TECHNICAL FIELD

Examples of the present disclosure relate generally to systems for presenting notifications on augmented reality (AR) displays.

BACKGROUND

AR technology overlays digital information onto the real world, using a device's camera and display to superimpose virtual objects, images, or text onto the physical environment. AR devices, such as smart glasses or head-mounted displays, can track the user's head or eyes to ensure a seamless and realistic viewing experience. This technology has a wide range of applications, including gaming, education, and industrial training.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
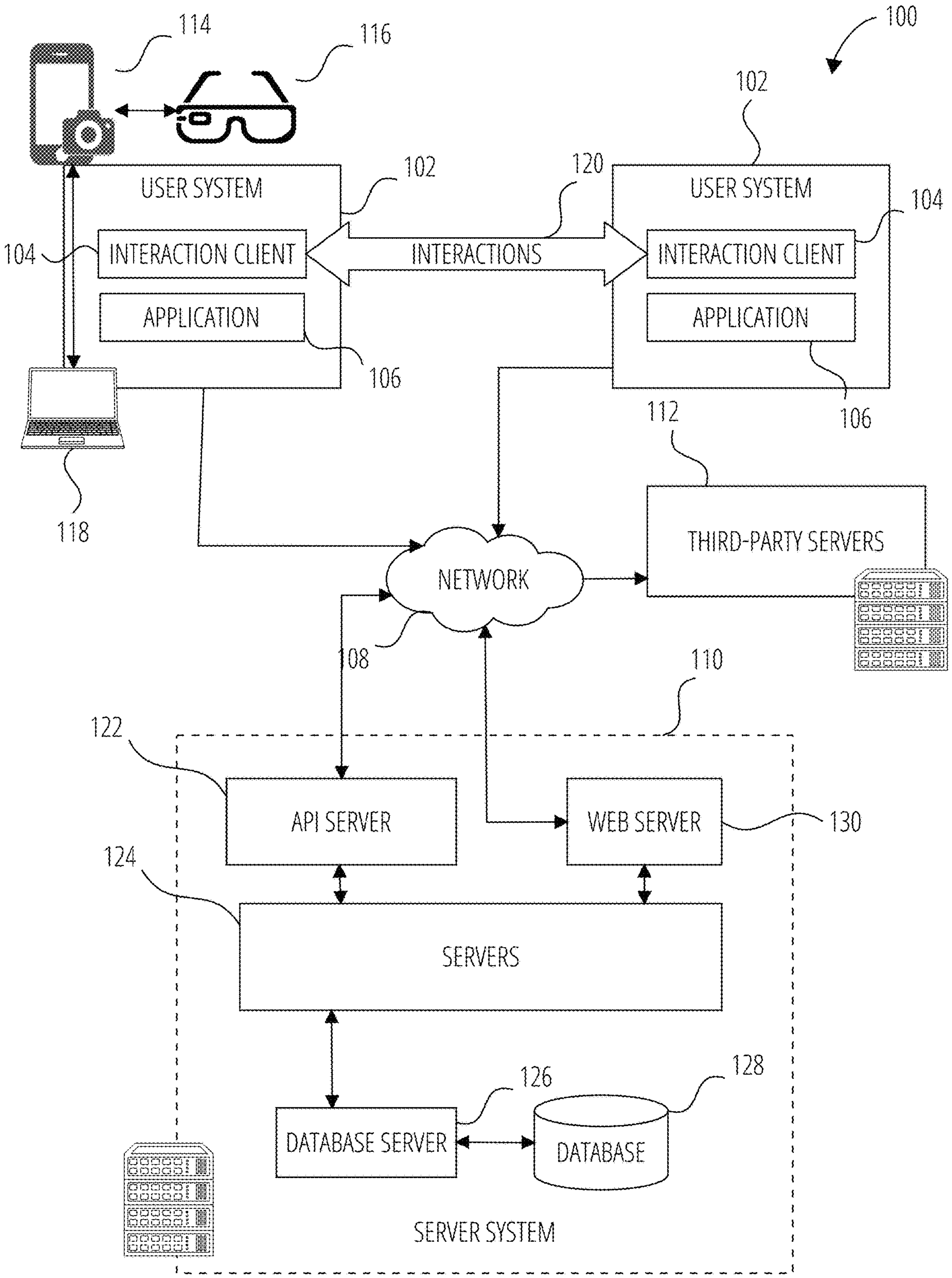
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term mobile device is used as an illustrative device; however, one skilled in the art will recognize that the methods, systems, and computer readable medium disclosed herein are applicable to other mobile devices such as wearable devices or non-wearable devices including AR, virtual reality (VR), extended reality (XR), and/or mixed reality (MR) head-wearable devices (also referred to as digital effect creation and/or presentation applications, devices and/or systems).

Conventional posture correction systems typically rely on physical wearable devices such as back braces, posture corrector straps, and electronic posture monitoring devices that attach to the user's body or clothing. These systems generally operate by providing physical restraint or electronic feedback when poor posture is detected through sensors that measure body position or muscle tension. For example, certain electronic posture correctors use adhesive sensors that stick to the user's back and vibrate when slouching is detected, while physical back braces and posture corrector straps use elastic materials and rigid supports to physically prevent slouching by pulling the shoulders back into proper alignment.

These conventional approaches suffer from significant inefficiencies and resource waste that limit their practical adoption and effectiveness. The devices are highly visible and stigmatizing, being bulky, unattractive, heavy, and obtrusive in nature, which creates social barriers to consistent use. They impose high friction on users who must remember to charge electronic components, properly position sensors, and consciously decide to wear dedicated posture correction equipment for the sole purpose of posture monitoring. This single-purpose design represents an inefficient use of resources, as users need to invest in, maintain, and carry additional devices that serve only one function rather than integrating posture monitoring into existing daily-use technology.

Despite these substantial limitations, the massive but unsatisfied demand in the market demonstrates the scale of the problem with poor satisfaction of existing solutions. The fundamental inefficiency lies in the fact that while these systems address a real need, given that many adults will suffer from back pain at some point and back pain causes significant lost productivity for employers, their cumbersome nature and high friction requirements result in poor user compliance and limited long-term effectiveness.

The disclosed techniques address these and other challenges by providing an invisible, integrated posture monitoring approach that leverages AR wearable devices (e.g., AR glasses) users already wear for other purposes, reducing the need for dedicated posture correction hardware. Unlike conventional systems that are highly visible, stigmatizing, and impose high friction requirements, the disclosed system operates passively in the background through ambient visual indicators positioned in the user's peripheral vision that do not detract from their ability to work. The disclosed system addresses the single-purpose limitation of existing solutions by integrating posture monitoring natively into the AR device's operating system, allowing users to benefit from posture correction while simultaneously using their AR devices for work, entertainment, or other daily activities without requiring conscious effort to remember, charge, or position dedicated posture correction equipment. Additionally, the disclosed techniques provide calibration algorithms that account for natural head movement by establishing reference points at the midpoint of the user's head to minimize rotational differences, coupled with machine learning capabilities that can personalize posture detection based on individual user patterns and environmental contexts, which can achieve higher accuracy and user satisfaction than conventional one-size-fits-all approaches.

Specifically, the disclosed techniques monitor the position of an AR wearable device worn by a user to detect improper posture. The disclosed techniques establish a calibration point based on the reference position of the wearable device, and then track the user's head position relative to the calibration point in real-time. If the head position deviates from the reference position by more than a predetermined threshold for a specified duration, the disclosed techniques detect improper posture and store associated data and/or generate notifications using the ambient visual indicator.

In this way, the disclosed techniques can present ambient posture feedback notifications, such as visual indicators (e.g., transitioning a virtual orb from a green circle to a red cube) in a way that eliminates traditional posture correction hardware limitations and user friction barriers. The unified architecture simultaneously monitors posture and displays ambient visual feedback within AR wearable device without requiring dedicated posture correction devices, physical back braces, or obtrusive wearable sensors, significantly improving user compliance and system adoption. This unified approach substantially increases operational efficiency by eliminating redundant posture monitoring hardware, reducing the need for users to charge and remember separate devices, and removing the stigma associated with bulky posture correction equipment. This technical solution measurably reduces the system complexity, user friction, and hardware requirements necessary to monitor and correct posture through head-wearable AR display systems, resulting in more seamless posture improvement with fewer barriers to consistent daily use.

Networked Computing Environment

FIG. 1 is a block diagram showing an example digital interaction system 100 for facilitating interactions and engagements (e.g., exchanging text messages, conducting text audio and video calls, or playing games) over a network. The digital interaction system 100 includes multiple user systems 102, each of which hosts multiple applications, including an interaction client 104 (e.g., an interaction application) and other applications 106. Each interaction client 104 is communicatively coupled, via one or more networks including a network 108 (e.g., the Internet), to other instances of the interaction client 104 (e.g., hosted on respective other user systems 102), a server system 110 and third-party servers 112. An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the server system 110 via the network 108. The data exchanged between the interaction clients 104 (e.g., interactions 120) and between the interaction clients 104 and the server system 110 includes functions (e.g., commands to invoke functions) and payload data (e.g., text, audio, video, or other multimedia data).

The server system 110 provides server-side functionality via the network 108 to the interaction clients 104. While certain functions of the digital interaction system 100 are described herein as being performed by either an interaction client 104 or by the server system 110, the location of certain functionality either within the interaction client 104 or the server system 110 may be a design choice. For example, it may be technically preferable to initially deploy particular technology and functionality within the server system 110 but to later migrate this technology and functionality to the interaction client 104 where a user system 102 has sufficient processing capacity.

The server system 110 supports various services and operations that are provided to the interaction clients 104. Such operations include transmitting data to, receiving data from, and processing data generated by the interaction clients 104. This data may include message content, client device information, geolocation information, digital effects (e.g., media augmentation and overlays), message content persistence conditions, entity relationship information, and live event information. Data exchanges within the digital interaction system 100 are invoked and controlled through functions available via user interfaces (UIs) of the interaction clients 104.

Turning now specifically to the server system 110, an Application Program Interface (API) server 122 is coupled to and provides programmatic interfaces to servers 124, making the functions of the servers 124 accessible to interaction clients 104, other applications 106 and third-party server 112. The servers 124 are communicatively coupled to a database server 126, facilitating access to a database 128 that stores data associated with interactions processed by the servers 124. Similarly, a web server 130 is coupled to the servers 124 and provides web-based interfaces to the servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the servers 124. The Application Program Interface (API) server 122 exposes various functions supported by the servers 124, including account registration; login functionality; the sending of interaction data, via the servers 124, from a particular interaction client 104 to another interaction client 104; the communication of media files (e.g., images or video) from an interaction client 104 to the servers 124; the settings of a collection of media data (e.g., a narrative); the retrieval of a list of friends of a user of a user system 102; the retrieval of messages and content; the addition and deletion of entities (e.g., friends) to an entity relationship graph (e.g., the entity graph 308); the location of friends within an entity relationship graph; and opening an application event (e.g., relating to the interaction client 104).

The servers 124 host multiple systems and subsystems, described below with reference to FIG. 2.

System Architecture

Figure 2:
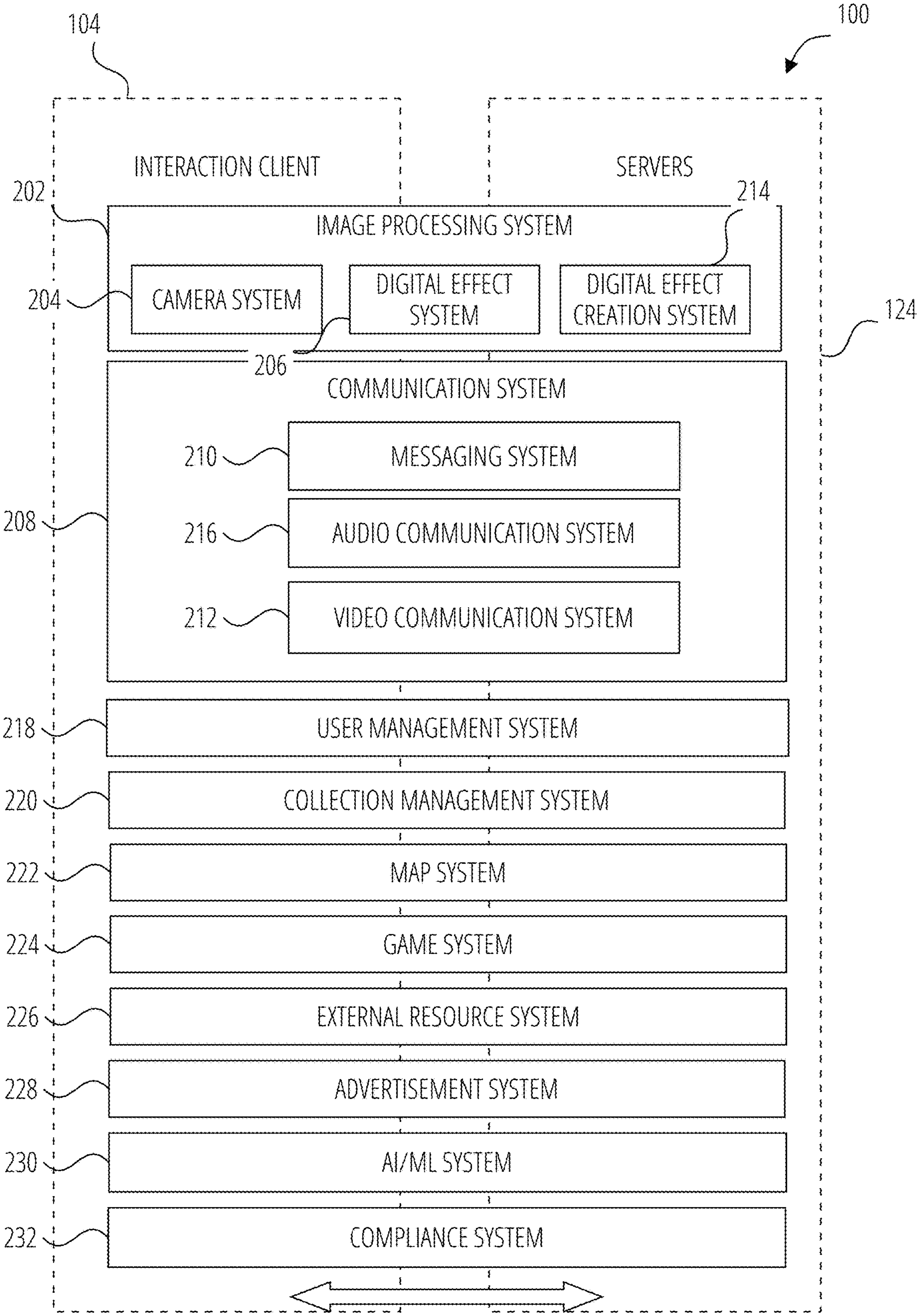
FIG. 2 is a diagrammatic representation of a digital interaction system that has both client-side and server-side functionality, according to some examples.

FIG. 2 is a block diagram illustrating further details regarding the digital interaction system 100, according to some examples. Specifically, the digital interaction system 100 is shown to comprise the interaction client 104 and the servers 124. The digital interaction system 100 embodies multiple subsystems, which are supported on the client-side by the interaction client 104 and on the server-side by the servers 124. In some examples, these subsystems are implemented as microservices. A microservice subsystem (e.g., a microservice application) may have components that enable it to operate independently and communicate with other services. Example components of a microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the digital interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the digital interaction system 100.

Service discovery: Microservice subsystems may find and communicate with other microservice subsystems of the digital interaction system 100. Service discovery mechanisms enable microservice subsystems to locate and communicate with other microservice subsystems in a scalable and efficient way.

Monitoring and logging: Microservice subsystems may need to be monitored and logged to ensure availability and performance. Monitoring and logging mechanisms enable the tracking of health and performance of a microservice subsystem.

In some examples, the digital interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and modify (e.g., augment, annotate or otherwise edit) media content associated with a message.

A camera system 204 includes control software (e.g., in a camera application) that interacts with and controls camera hardware (e.g., directly or via operating system controls) of the user system 102 to modify real-time images captured and displayed via the interaction client 104.

The digital effect system 206 provides functions related to the generation and publishing of digital effects (e.g., media overlays) for images captured in real-time by cameras of the user system 102 or retrieved from memory of the user system 102. For example, the digital effect system 206 (via a digital effect application which can be part of the interaction client 104) operatively selects, presents, and displays digital effects (e.g., media overlays such as image filters or modifications) to the interaction client 104 for the modification of real-time images received via the camera system 204 or stored images retrieved from memory 802 (FIG. 8) of a user system 102. These digital effects are selected by the digital effect system 206 and presented to a user of an interaction client 104, based on a number of inputs and data, such as for example:

Geolocation of the user system 102; and

Entity relationship information of the user of the user system 102.

Digital effects may include audio and visual content and visual effects. Examples of audio and visual content include pictures, texts, logos, animations, and sound effects. Examples of visual effects include color overlays and media overlays. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A digital effect presentation system embodies a digital effect application of the digital effect system 206 and a digital effect presentation component, such as AR glasses or other head-wearable apparatus 116. Details of the operation of the digital effect presentation system are provided below.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The digital effect creation system 214 supports augmented reality developer platforms and includes an application for content creators (e.g., artists and developers) to create and publish digital effects (e.g., augmented reality experiences) of the interaction client 104. The digital effect creation system 214 provides a library of built-in features and tools to content creators including, for example custom shaders, tracking technology, and templates.

In some examples, the digital effect creation system 214 provides a merchant-based publication platform that enables merchants to select a particular digital effect associated with a geolocation via a bidding process. For example, the digital effect creation system 214 associates a media overlay of the highest bidding merchant with a corresponding geolocation for a predefined amount of time.

A communication system 208 is responsible for enabling and processing multiple forms of communication and interaction within the digital interaction system 100 and includes a messaging system 210, an audio communication system 216, and a video communication system 212. The messaging system 210 is responsible, in some examples, for enforcing the temporary or time-limited access to content by the interaction clients 104. The messaging system 210 incorporates multiple timers that, based on duration and display parameters associated with a message or collection of messages (e.g., a narrative), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

Figure 3:
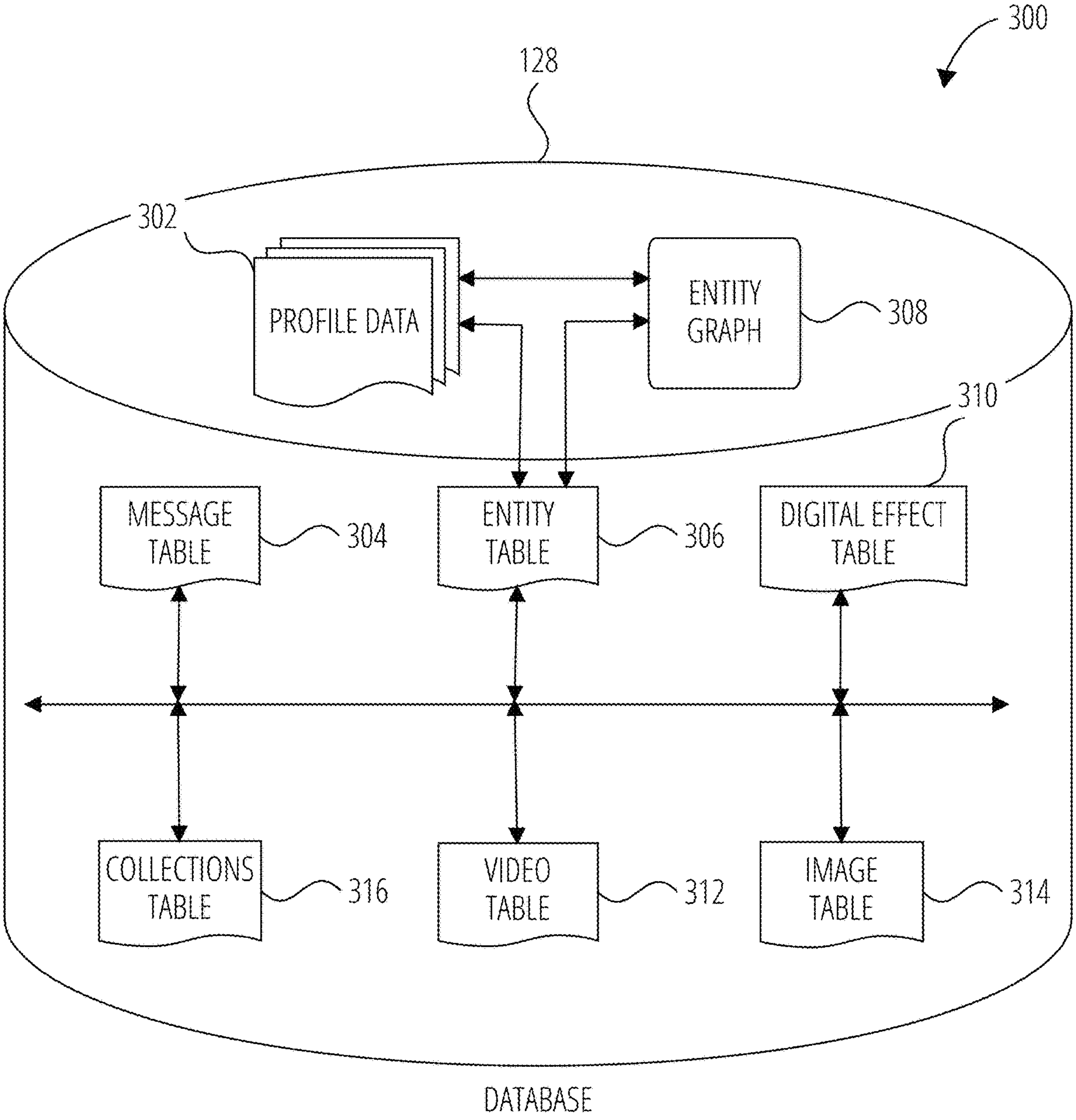
FIG. 3 is a diagrammatic representation of a data structure as maintained in a database, according to some examples.

A user management system 218 is operationally responsible for the management of user data and profiles, and maintains entity information (e.g., stored in entity tables 306, entity graphs 308 and profile data 302, shown in FIG. 3) regarding users and relationships between users of the digital interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event collection." Such a collection may be made available for a specified time period, such as the duration of an event to which the content relates. For example, content relating to a music concert may be made available as a "concert collection" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the digital interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the digital interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the digital interaction system 100. The digital interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the servers 124. The SDK includes Application Programming Interfaces (APIs) with functions that can be called or invoked by the web-based application. The servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to servers 124. The servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional (2D) avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and handles the delivery and presentation of these advertisements.

An artificial intelligence and machine learning system 230 provides a variety of services to different subsystems within the digital interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the digital effect system 206 to generate modified content and augmented reality experiences, such as adding virtual objects or animations to real-world images. The artificial intelligence and machine learning system 230 can also be trained to automatically generate calibration points for triggering improper posture notifications.

The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the server system 110. The artificial intelligence and machine learning system 230 may also work with the audio communication system 216 to provide speech recognition and natural language processing capabilities, allowing users to interact with the digital interaction system 100 using voice commands.

A compliance system 232 facilitates compliance by the digital interaction system 100 with data privacy and other regulations, including for example the California Consumer Privacy Act (CCPA), General Data Protection Regulation (GDPR), and Digital Services Act (DSA). The compliance system 232 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance system 232 also incorporates opt-in/opt-out management and privacy controls across the digital interaction system 100, empowering users to manage their data preferences. The compliance system 232 is designed to handle sensitive data by obtaining explicit consent, implementing strict access controls and in accordance with applicable laws.

In some examples, the artificial intelligence and machine learning system 230, working in coordination with the interaction client 104 and other subsystems within the digital interaction system 100, implements the posture monitoring functionality (e.g., a posture monitoring system) that provides various alternatives for detecting and correcting improper posture. The posture monitoring system may be implemented as a native component of an AR wearable device's operating system, allowing for seamless integration with the user's daily activities without requiring dedicated posture correction hardware. In some cases, the posture monitoring system may be implemented as part of the messaging application 1048 and/or interaction client 104 of the user system 102 (e.g., the AR wearable device or head-wearable apparatus 116)

Initially, a calibration point for improper posture detection can be established through multiple approaches that provide flexibility for different user scenarios and preferences. The primary calibration methodology involves computing a forward vector direction from the AR wearable device, generating an inverted vector by inverting the forward vector direction by a negative value to determine a direction toward a back of the user's head, and scaling the inverted vector by a predetermined value to identify a midpoint of the user's head. This calibration approach reduces rotational differences during head movement by positioning the calibration point at or near the midpoint of the user's head, which remains relatively stable regardless of natural head rotation and movement.

To illustrate the calibration process with specific computational examples, consider a scenario where the AR wearable device initially detects its position at coordinates (0, 1.6, 0) in 3D world space, representing a user sitting at a desk with the AR glasses positioned 1.6 meters above the floor. The posture monitoring system first computes the forward vector direction from the AR device's orientation, which might yield a normalized forward vector of (0, 0, −1) indicating the user is looking straight ahead in the negative Z direction. To determine the direction toward the back of the user's head, the posture monitoring system generates an inverted vector by multiplying the forward vector by negative one: (0, 0, −1) x−1=(0, 0, 1). This inverted vector now points from the glasses position toward the back of the user's head along the positive Z axis.

The posture monitoring system then scales this inverted vector by a predetermined value, such as in the range of 0.1 to 0.15 meters (10-15 centimeters), to reach the approximate midpoint of the user's head. For example, scaling the inverted vector (0, 0, 1) by 0.12 meters yields a displacement vector of (0, 0, 0.12). Adding this displacement to the original position of the AR glasses provides the calibration point coordinates: (0, 1.6, 0)+(0, 0, 0.12)=(0, 1.6, 0.12). The posture monitoring system may further adjust this calibration point slightly above the computed midpoint, such as adding an additional 0.02 meters in the Y direction, resulting in a final calibration point of (0, 1.62, 0.12). This subtle vertical offset ensures that downward head movements associated with slouching will be detected when the user's head position drops below this reference point by more than the predetermined threshold, which might be set to 0.05 meters for initial sensitivity calibration.

The effectiveness of this calibration approach becomes apparent when analyzing head rotation scenarios. When the user rotates their head left or right while maintaining proper posture, the AR glasses position might change from (0, 1.6, 0) to (−0.1, 1.6, −0.05) due to natural head movement, but the calibration point calculation dynamically adjusts based on the updated forward vector direction. The new forward vector might be (−0.2, 0, −0.98) after head rotation, and when inverted and scaled, produces a calibration point that remains approximately at the head's midpoint despite the rotational change. This mathematical approach ensures that normal head movements during conversation or task switching do not trigger false posture alerts, while genuine postural deviations such as slouching, where the AR glasses position drops significantly below the calibration threshold for the specified duration, are accurately detected and reported.

For manual calibration scenarios, the image processing system 202 provides visual guidance showing proper posture positioning to users during calibration processes. The posture monitoring system displays instructional content, posture examples, and calibration interfaces through the AR wearable device. Upon receiving manual calibration input from users positioned in proper posture, the posture monitoring system captures one or more 3D position coordinates of the AR wearable device and stores these coordinates as one or more reference calibration points. The camera system 204 enables visual tracking capabilities that allow the posture monitoring system to detect user hand gestures within the field of view of the AR wearable device. The system displays a hand icon with a calibration indicator to guide user interaction and recognizes specified hand gestures through visual tracking systems integrated with the AR wearable device. Upon detecting predetermined hand gestures, the posture monitoring system presents a calibration menu interface that allows users to initiate manual calibration processes.

For example, when a user first initiates the posture monitoring feature, the image processing system 202 may display a series of instructional screens within the AR interface showing visual demonstrations of proper sitting posture, including illustrations of correct back alignment, head position, and shoulder positioning. These visual guides help users understand the optimal posture they should maintain before establishing their calibration point, ensuring that the reference position represents genuinely good posture rather than the user's potentially poor habitual positioning. The camera system 204 enables visual tracking capabilities that allow the posture monitoring system to detect user hand gestures within the field of view of the AR wearable device. The posture monitoring system can display a hand icon with a calibration indicator to guide user interaction and recognizes specified hand gestures through visual tracking systems integrated with the AR wearable device. Upon detecting predetermined hand gestures, the posture monitoring system presents a calibration menu interface that allows users to initiate manual calibration processes. In a specific implementation example, the posture monitoring system may display a persistent hand icon labeled "CALIBRATE" in the user's field of view, prompting them to raise their hand into the detection zone. When the camera system 204 detects the user's raised hand gesture within the predetermined area, the visual tracking algorithms process the hand position and movement to determine when the user is making the calibration gesture. This gesture recognition triggers the presentation of a calibration menu interface that provides options for the user to confirm their current posture as the reference position, allowing them to proceed with storing their current 3D head position coordinates as the calibration point for subsequent posture monitoring activities.

The integration between the image processing system 202 and camera system 204 creates a seamless calibration workflow where users receive real-time visual feedback throughout the process. As users adjust their posture in response to the visual guidance, the camera system 204 continuously monitors their positioning and can provide immediate feedback about whether they have achieved the recommended posture alignment before finalizing the calibration. For instance, the system might display dynamic visual indicators such as colored overlays or progress bars that change from red to green as the user's posture improves and approaches the ideal calibration position. Once the user has maintained the proper posture for a predetermined duration and activates the calibration through the detected hand gesture, the posture monitoring system captures multiple 3D coordinate samples over a brief time period to account for natural minor movements, then averages these coordinates to establish a robust calibration point that represents the user's optimal working posture in their specific environment and seating configuration. This calibration point can be stored and used to detect improper posture.

Alternative automatic calibration approaches utilize the artificial intelligence and machine learning system 230 to implement pose detection algorithms that work in conjunction with posture monitoring to automatically determine when users are in seated, standing, or other positions. The pose detection can utilize six degrees of freedom (6DOF) tracking data, environmental floor detection systems, and/or user height measurements to distinguish between different body position states and automatically select appropriate calibration parameters. When the posture monitoring system detects that the user is seated at a work desk through environmental analysis, the posture monitoring system can automatically initiate a calibration sequence without user input by analyzing the user's head position stability over a predetermined time period and establishing the calibration point when the head position remains stable within a tolerance range.

The digital effect system 206 works in conjunction with the posture monitoring functionality to generate and display ambient visual indicators that provide posture feedback to users. These visual indicators comprise geometric shapes that change form based on posture quality, such as transitioning from a green circle when the user maintains proper posture to a red cube as posture begins to degrade. The visual indicators can be positioned in the user's peripheral vision to avoid interfering with other activities. The digital effect creation system 214 provides tools for customizing the visual appearance and behavior of posture feedback indicators, enabling content creators to design different geometric transformations, color schemes, and/or transition effects for the ambient visual indicators.

The posture monitoring system continuously monitors the current position of the AR wearable device relative to the established calibration point to detect when the user's head position deviates from the reference position by more than a predetermined threshold. The monitoring includes tracking vertical displacement of the AR wearable device relative to the calibration point and detecting when displacement exceeds downward thresholds indicating improper posture, such as slouching. The posture monitoring system classifies posture deviations into severity categories including slight, moderate, and severe deviations, analyzing severity levels by measuring the distance of the current position of the AR wearable device from the calibration point and determining notification timing based on the analyzed severity levels.

For example, once a calibration point is established at coordinates representing the midpoint of the user's head during proper posture (such as (0, 1.62, 0.12) in 3D world space), the posture monitoring system tracks real-time position changes of the AR glasses or AR wearable device. When the user begins to slouch, the vertical displacement of the AR glasses position might drop from the calibration point of 1.62 meters to 1.50 meters, representing a downward displacement of 0.12 meters. The monitoring includes tracking vertical displacement of the AR wearable device relative to the calibration point and/or detecting when displacement exceeds downward thresholds indicating improper posture, such as slouching. If the predetermined threshold is set to 0.05 meters, this 0.12-meter downward movement would trigger the posture detection algorithm since it exceeds the threshold by more than double the acceptable range.

The posture monitoring system classifies posture deviations into severity categories including slight, moderate, and severe deviations, analyzing severity levels by measuring the distance of the current position of the AR wearable device from the calibration point and determining notification timing based on the analyzed severity levels. For instance, a slight deviation might be classified when the user's head position moves 0.06-0.10 meters from the calibration point, triggering a notification, for example, only after the poor posture persists for several minutes to avoid disruption during brief movements. A moderate deviation, such as 0.10-0.15 meters displacement, might trigger notifications after, for example, 30-60 seconds of sustained poor posture. Severe deviations, where the user's head drops more than 0.15 meters below the calibration point (indicating significant slouching), may trigger immediate notifications, for example, within 10 seconds. The posture monitoring system can dynamically adjust these thresholds and timing parameters based on individual user patterns and environmental contexts, ensuring that notifications are delivered at optimal moments to encourage posture correction without interrupting workflow or causing notification fatigue.

In some cases, the animation of the ambient visual indicator dynamically responds to the classified severity levels of posture deviation, creating smooth bidirectional transitions that provide real-time feedback to users about their posture quality. When the posture monitoring system analyzes severity levels by measuring the distance of the current position of the AR wearable device from the calibration point, the posture monitoring system maps these measurements to specific geometric transformations that correspond to the deviation magnitude. For slight posture deviations, the ambient indicator begins a gradual transformation from the green circle toward intermediate visual states, such as changing color saturation or initiating subtle geometric morphing, while maintaining predominantly circular characteristics. As deviation severity increases to moderate levels, the animation accelerates the geometric transformation, with the circle beginning to develop angular edges and the color shifting more noticeably toward amber or orange hues. For severe posture deviations, the ambient visual indicator completes its transformation to a red cube, with sharp geometric edges and full color saturation indicating the need for immediate posture correction. Importantly, the animation system operates bidirectionally, so when users improve their posture and move closer to the calibration point, the geometric transformation reverses through the same intermediate states, such as the red cube softening its edges, transitioning through intermediate colors, and gradually reforming into the green circle as proper posture is restored, providing continuous visual feedback that encourages and reinforces positive posture correction behaviors.

The messaging system 210 within the communication system 208 handles the delivery of posture-related notifications and alerts to users through the AR wearable device. The notification system operates dynamically, providing immediate notifications when severe posture deviations are detected and delayed notifications when moderate posture deviations persist over extended durations. For slight deviations, the system assigns notification delay timers of longer durations, while severe deviations trigger immediate notifications. The messaging system 210 coordinates with other health-related notifications to avoid conflicts and minimize user disruption.

The artificial intelligence and machine learning system 230 implements adaptive algorithms that personalize posture detection based on individual user patterns and environmental contexts. The system collects posture data samples from multiple users across diverse demographic groups and working environments, labels the collected data with corresponding posture quality classifications and user correction responses, and trains neural network models using supervised learning techniques to recognize patterns indicative of improper posture. The system continuously refines posture detection algorithms based on user feedback and correction responses, analyzing user correction response times to posture notifications, adjusting notification sensitivity based on measured response effectiveness, and identifying optimal notification timing patterns for individual users.

The user management system 218 stores and manages multiple calibration points associated with different resting poses for individual users. The system maintains calibration data for various user positions including sitting, standing, and reclining postures, and automatically retrieves appropriate calibration points based on detected user poses. The user management system 218 handles user preferences and settings related to posture monitoring, including consent management for data collection and notification preferences. The system provides user configuration settings for enabling or disabling data collection associated with improper posture detection and implements notification toggle controls allowing users to disable posture alerts while maintaining background data collection for analytical purposes.

For generating calibration points across different postures, the user management system 218 employs a multi-stage calibration process that accounts for the distinct biomechanical characteristics of each resting pose. When establishing calibration points for sitting postures, the user management system 218 calculates the forward vector direction from the AR wearable device, inverts this vector by negative one to determine the direction toward the back of the user's head, and scales the inverted vector by a predetermined value optimized for seated positions to identify the midpoint of the head during typical desk work scenarios. For standing postures, the system adjusts the scaling parameters and vertical offset calculations to account for the increased height and different head positioning that naturally occurs when users are upright, while reclining postures utilize modified vector calculations that accommodate the backward head tilt and altered body alignment characteristic of relaxed positions. The user management system 218 stores these pose-specific calibration parameters as distinct data structures within the user management system 218, including the computed midpoint coordinates, forward vector orientations, scaling factors, and threshold tolerances that are uniquely calibrated for each posture type.

The storage and retrieval mechanism for multiple calibration points operates through an intelligent pose-detection integration that automatically determines the user's current body position and selects the appropriate calibration reference. The user management system 218 maintains a calibration database that associates each stored calibration point with specific pose identifiers, environmental context data such as typical workspace configurations, and temporal usage patterns that indicate when each posture is most commonly adopted by individual users. When the artificial intelligence and machine learning system 230 detects a transition between poses using 6DOF tracking data and environmental floor detection systems, the user management system 218 automatically queries the appropriate calibration point from storage and updates the active posture monitoring parameters without requiring user intervention. The artificial intelligence and machine learning system 230 also implements a learning algorithm that continuously refines the calibration points over time based on user behavior patterns, automatically adjusting threshold values and reference positions to improve detection accuracy for each individual user's unique postural characteristics across different resting poses, ensuring that the posture monitoring remains effective regardless of whether the user is sitting at a desk, standing at a workstation, or reclining in a relaxed position.

The database server 126 and database 128 store posture metrics that include comprehensive posture analytics data including cumulative time periods when users maintain proper posture, total session durations for posture monitoring activities, and time periods requiring posture correction. The stored data enables computation of posture quality scores as percentages of proper posture time relative to total session time, and supports generation of detailed analytics reports containing posture metrics and trends over time. This data processing capability allows for comprehensive tracking of user progress and identification of patterns in posture degradation for personalized insights.

For example, during a typical work session, the posture monitoring system might record that a user maintained proper posture for 1 minute and 7 seconds, required posture correction for 16 seconds, resulting in a total session duration of 1 minute and 23 seconds. The database server 126 stores these discrete time measurements alongside timestamps, user identifiers, and environmental context data such as workspace location and time of day. Additional stored metrics include the frequency of posture deviations, the severity levels of each deviation event (classified as slight, moderate, or severe), and the user's response times to posture correction notifications, enabling comprehensive behavioral analysis over extended periods.

The stored data enables computation of posture quality scores as percentages of proper posture time relative to total session time, and supports generation of detailed analytics reports containing posture metrics and trends over time. Continuing from the previous example, the posture monitoring system can calculate the posture quality score as (67 seconds of good posture #83 seconds total session time)×100=80% posture score. The database server 126 maintains historical records showing posture score progression over time, such as a user's scores declining from 63.1% on day one to 62.5% on day two and 61.7% on day three, indicating a trend toward posture degradation that triggers personalized intervention recommendations. The posture monitoring system can also compute aggregate statistics such as weekly averages, monthly improvement rates, and correlations between posture quality and factors like session length, time of day, and work intensity.

This data processing capability allows for comprehensive tracking of user progress and identification of patterns in posture degradation for personalized insights. For instance, the analytics engine might determine that a particular user's posture quality consistently drops by 15-20% during afternoon sessions compared to morning sessions, or that sessions longer than 45 minutes show 30% higher correction requirements in the final 15 minutes. The database server 126 supports advanced pattern recognition that can identify individual user behaviors, such as a tendency to slouch more severely when working on certain types of tasks or during specific times of the day. These personalized insights enable the posture monitoring system to proactively adjust notification timing, suggest optimal break intervals, and provide customized posture improvement recommendations based on each user's unique behavioral patterns and improvement trajectory over time.

The posture monitoring system integrates with broader health platform functionalities provided by other subsystems within the digital interaction system 100. The integration includes implementation of eye strain reduction reminders such as twenty-twenty-twenty rules, generation of stand-up reminders when prolonged sitting periods are detected, and provision of hydration notifications at predetermined intervals during work sessions. The game system 224 incorporates posture monitoring into gamification features that encourage proper posture maintenance through rewards, achievements, and progress tracking, while the map system 222 correlates posture data with location information to provide insights about posture quality in different environments.

For example, the posture monitoring system may implement a reward-based feature unlocking mechanism where maintaining a posture quality score above a predetermined threshold for a specified time period grants users access to enhanced features within the messaging application and broader digital interaction system 100. For example, when a user maintains a posture score above 75% for a continuous period of one week, the posture monitoring system may unlock access to premium AR experiences through the digital effect system 206, such as exclusive digital effects, advanced virtual content overlays, or specialized augmented reality environments that are not available to users with lower posture compliance rates. Similarly, sustained good posture performance may unlock enhanced communication modalities through the communication system 208, including access to high-quality video filters during video communications via the video communication system 212, premium voice enhancement features through the audio communication system 216, or exclusive messaging themes and customization options within the messaging system 210. The game system 224 coordinates these reward mechanisms by tracking posture achievement milestones and automatically updating user permissions to access locked features, while the user management system 218 maintains records of earned privileges and ensures that users who fall below the threshold for extended periods may have certain premium features temporarily disabled until their posture performance improves, which can create a continuous incentive system that encourages long-term adherence to proper posture habits. This gamification approach leverages the comprehensive posture analytics stored in the database 128 to create personalized achievement pathways that motivate users to maintain good posture while simultaneously enhancing their overall experience with the AR wearable device's communication and entertainment capabilities.

The collection management system 220 organizes and curates posture-related content including educational materials, proper posture demonstrations, and user-generated content related to posture improvement. The system creates collections of posture exercises, workspace ergonomics tips, and success stories from users who have improved their posture through the system. The external resource system 226 enables integration of posture monitoring data with third-party health and wellness applications, allowing users to share their posture analytics with external fitness tracking services, workplace wellness programs, or healthcare providers through secure API interfaces.

The advertisement system 228 provides targeted advertising related to ergonomic products, workplace wellness solutions, and health services based on user posture data and preferences, while respecting user privacy settings and consent preferences. The audio communication system 216 within the communication system 208 provides audio-based posture notifications and guidance when visual feedback is not appropriate or desired, including gentle chimes, voice prompts, or spoken reminders about posture correction. The video communication system 212 integrates posture monitoring during video calls and conferences conducted through the AR wearable device, providing real-time posture feedback during video communications while delivering posture alerts discretely to avoid disrupting ongoing communications.

The compliance system 232 handles privacy and consent management for posture-related data collection in accordance with applicable privacy regulations. The system provides user configuration settings for enabling or disabling data collection associated with improper posture detection and implements notification toggle controls allowing users to disable posture alerts while maintaining background data collection for analytical purposes. The posture monitoring functionality operates continuously in background mode, even when the AR display is in an off state, through integration with low-power circuitry and sensors, maintaining posture detection algorithms and accumulating posture deviation data during display-off periods, delivering accumulated notifications when the AR display is reactivated.

The interaction client 104 coordinates all posture monitoring functionality across the various subsystems, ensuring seamless integration with the user's daily activities and other applications running on the AR wearable device. The interaction client 104 manages the user interface elements for posture monitoring, handles transitions between different posture monitoring modes, and ensures that posture functionality operates harmoniously with other features of the digital interaction system 100 without compromising user experience or system performance. This comprehensive coordination enables the posture monitoring system to provide multiple implementation alternatives while maintaining consistent functionality across the entire digital interaction platform.

Data Architecture

FIG. 3 is a schematic diagram illustrating data structures 300, which may be stored in the database 128 of the server system 110, according to certain examples. While the content of the database 128 is shown to comprise multiple tables, it will be appreciated that the data could be stored in other types of data structures (e.g., as an object-oriented database).

The database 128 includes message data stored within a message table 304. This message data includes at least message sender data, message recipient (or receiver) data, and a payload. Further details regarding information that may be included in a message, and included within the message data stored in the message table 304, are described below with reference to FIG. 3.

An entity table 306 stores entity data, and is linked (e.g., referentially) to an entity graph 308 and profile data 302. Entities for which records are maintained within the entity table 306 may include individuals, corporate entities, organizations, objects, places, events, and so forth. Regardless of entity type, any entity regarding which the server system 110 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the digital interaction system 100.

Certain permissions and relationships may be attached to each relationship, and to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 306. Such privacy settings may be applied to all types of relationships within the context of the digital interaction system 100, or may selectively be applied to certain types of relationships.

The profile data 302 stores multiple types of profile data about a particular entity. The profile data 302 may be selectively used and presented to other users of the digital interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the digital interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 128 also stores digital effect data, such as overlays or filters, in a digital effect table 310. The digital effect data is associated with and applied to videos (for which data is stored in a video table 312) and images (for which data is stored in an image table 314).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other digital effect data that may be stored within the image table 314 includes augmented reality content items (e.g., corresponding to augmented reality experiences). An augmented reality content item may be a real-time special effect and sound that may be added to an image or a video.

A collections table 316 stores data regarding collections of messages and associated image, video, or audio data, which are compiled into a collection (e.g., a narrative or a gallery). The creation of a particular collection may be initiated by a particular user (e.g., each user for which a record is maintained in the entity table 306). A user may create a "personal collection" in the form of a collection of content that has been created and sent/broadcast by that user. To this end, the user interface of the interaction client 104 may include an icon that is user-selectable to enable a sending user to add specific content to his or her personal narrative.

A collection may also constitute a "live collection," which is a collection of content from multiple users that is created manually, automatically, or using a combination of manual and automatic techniques. For example, a "live collection" may constitute a curated stream of user-submitted content from various locations and events. Users whose client devices have location services enabled and are at a common location event at a particular time may, for example, be presented with an option, via a user interface of the interaction client 104, to contribute content to a particular live collection. The live collection may be identified to the user by the interaction client 104, based on his or her location.

A further type of content collection is known as a "location collection," which enables a user whose user system 102 is located within a specific geographic location (e.g., on a college or university campus) to contribute to a particular collection. In some examples, a contribution to a location collection may employ a second degree of authentication to verify that the end-user belongs to a specific organization or other entity (e.g., is a student on the university campus).

As mentioned above, the video table 312 stores video data that, in some examples, is associated with messages for which records are maintained within the message table 304. Similarly, the image table 314 stores image data associated with messages for which message data is stored in the entity table 306. The entity table 306 may associate various digital effects from the digital effect table 310 with various images and videos stored in the image table 314 and the video table 312.

Data Communications Architecture

Figure 4:
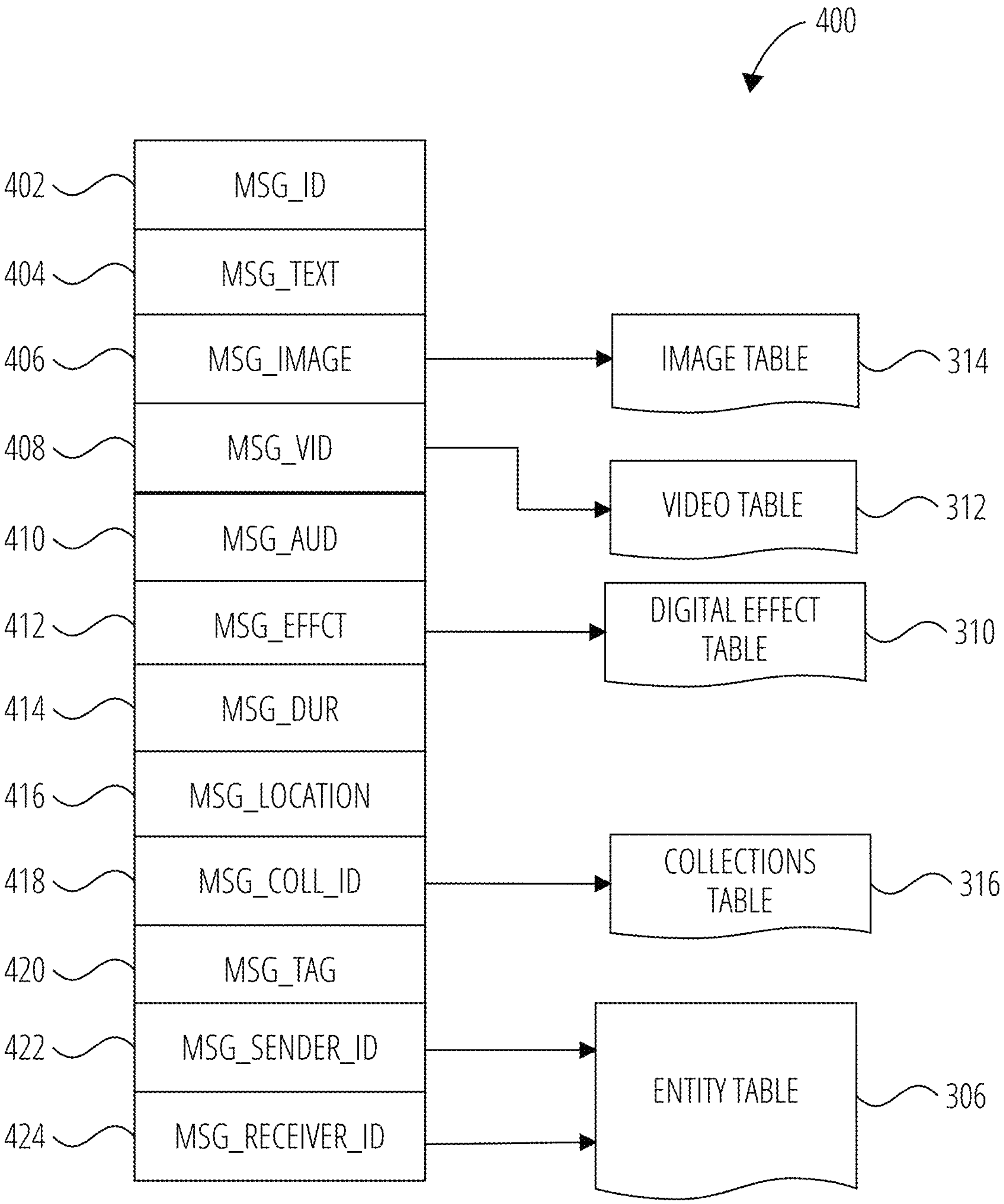
FIG. 4 is a diagrammatic representation of a message, according to some examples.

FIG. 4 is a schematic diagram illustrating a structure of a message 400, according to some examples, generated by an interaction client 104 for communication to a further interaction client 104 via the servers 124. The content of a particular message 400 is used to populate the message table 304 stored within the database 128, accessible by the servers 124. Similarly, the content of a message 400 is stored in memory as "in-transit" or "in-flight" data of the user system 102 or the servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 314.
- Message video payload 408: video data, captured by a camera component or retrieved from a memory component of the user system 102, and that is included in the message 400. Video data for a sent or received message 400 may be stored in the video table 312.
- Message audio payload 410: audio data, captured by a microphone or retrieved from a memory component of the user system 102, and that is included in the message 400.
- Message digital effect data 412: digital effect data (e.g., filters, stickers, or other annotations or enhancements)

that represents digital effects to be applied to message image payload 406, message video payload 408, or message audio payload 410 of the message 400. Digital effect data for a sent or received message 400 may be stored in the digital effect table 310.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message collection identifier 418: identifier values identifying one or more content collections (e.g., "stories" identified in the collections table 316) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 314. Similarly, values within the message video payload 408 may point to data stored within a video table 312, values stored within the message digital effect data 412 may point to data stored in a digital effect table 310, values stored within the message collection identifier 418 may point to data stored in a collections table 316, and values stored within the message sender identifier 422 and the message receiver identifier 424 may point to user records stored within an entity table 306.

Figure 5:
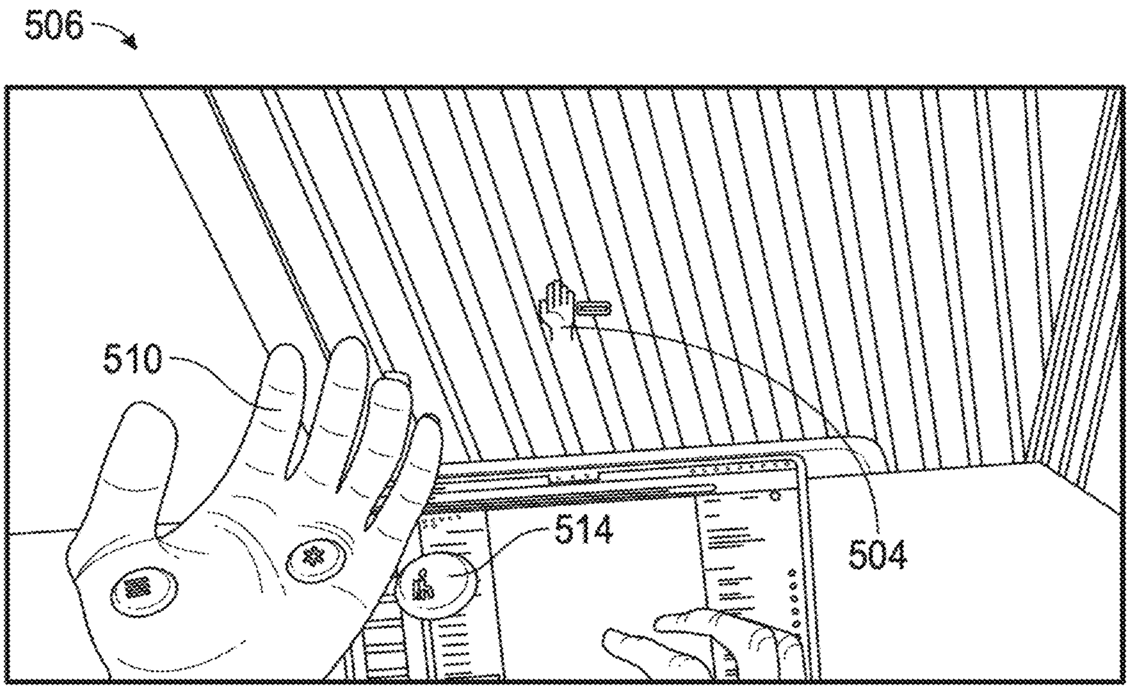
FIG. 5 are diagrams of user interfaces for calibrating proper posture, according to some examples.
Figure 5:
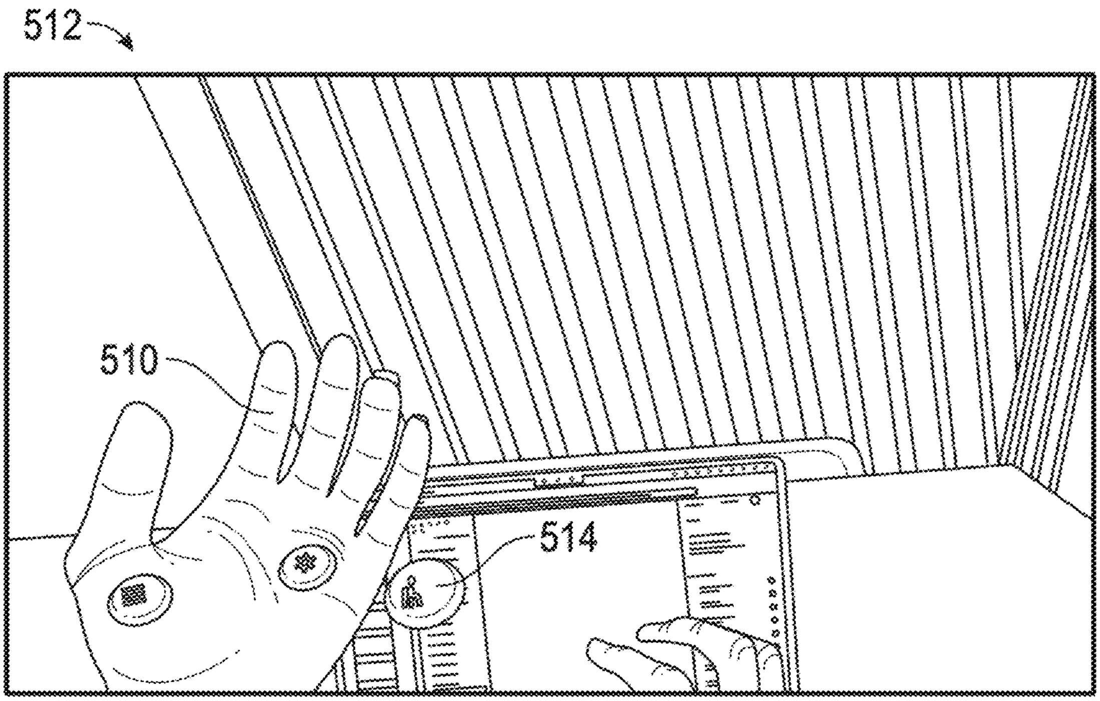

FIG. 5 are diagrams 506 and 512 of user interfaces for calibrating proper posture, according to some examples. Specifically, FIG. 5 demonstrates the interactive calibration workflow that enables users to establish their personalized posture reference points through the AR wearable device interface. The diagram 506 illustrates the initial workspace environment where the user is positioned at their typical workstation, representing the real-world environment where users spend significant portions of their day and where posture monitoring will provide the most practical benefit for preventing slouching and maintaining ergonomic alignment. This workspace setting validates the practical application context where the artificial intelligence and machine learning system 230 coordinates with the interaction client 104 to provide comprehensive posture calibration functionality.

The hand icon 504 serves as a user interface element that guides users through the calibration process by providing visual cues for proper hand positioning during the calibration sequence. The digital effect system 206 works in conjunction with the camera system 204 to display this hand icon with a calibration indicator to guide user interaction, prompting users to raise their hand into the detection zone where the camera system can recognize the specified hand gesture. This visual guidance ensures that users understand exactly where to position their hand to trigger the calibration interface, reducing confusion and improving the reliability of the calibration process through the coordinated operation of multiple subsystems.

The transition from diagram 506 to diagram 512 illustrates the system's response to successful hand gesture detection, where the camera system 204 has recognized the user's raised hand gesture within the predetermined detection zone. The appearance of the calibration menu interface 514 in the diagram 512 represents the system's presentation of calibration options that allow users to initiate the manual calibration process. This interface appears as a result of the visual tracking systems integrated with the AR wearable device successfully detecting and recognizing the hand gesture 510, demonstrating the seamless integration between the camera system 204, image processing system 202, and user interface components managed by the interaction client 104.

The hand gesture 510 captured in the diagram 512 represents the specific user input that triggers the calibration sequence, showing the user's hand positioned within the field of view of the AR wearable device. The camera system 204 monitors the field of view to detect when users perform specified hand gestures within predetermined detection zones, and this gesture recognition capability enables the posture monitoring system to present the calibration menu interface comprising options associated with manual calibration input. The successful detection of this hand gesture initiates the process whereby users can establish their 3D position coordinates as reference calibration points for subsequent posture monitoring.

The calibration menu interface 514 displayed in the lower portion of diagram 512 represents the culmination of the gesture recognition process, providing users with interactive options to complete their posture calibration. This interface allows users to confirm their current posture as the reference position, enabling the image processing system 202 to capture 3D position coordinates of the AR wearable device upon receiving manual calibration input, such as by selecting a calibration trigger option from the calibration menu interface 514. The interface design ensures that users can easily initiate the calibration process while positioned in their optimal working posture, establishing accurate reference points for detecting future posture deviations such as slouching or improper head positioning through the coordinated operation of the artificial intelligence and machine learning system 230.

The workspace environment shown in both diagrams emphasizes the practical application context where posture monitoring provides maximum benefit to users engaged in computer-based work activities. The presence of the laptop computer and typical office furniture demonstrates the real-world setting where users are most likely to develop poor posture habits over extended periods, supporting the system's goal of providing invisible posture correction that integrates seamlessly with daily work activities. This environmental context validates the need for AR-based posture monitoring that can operate continuously without requiring dedicated hardware or disrupting the user's primary work tasks.

Figure 6:
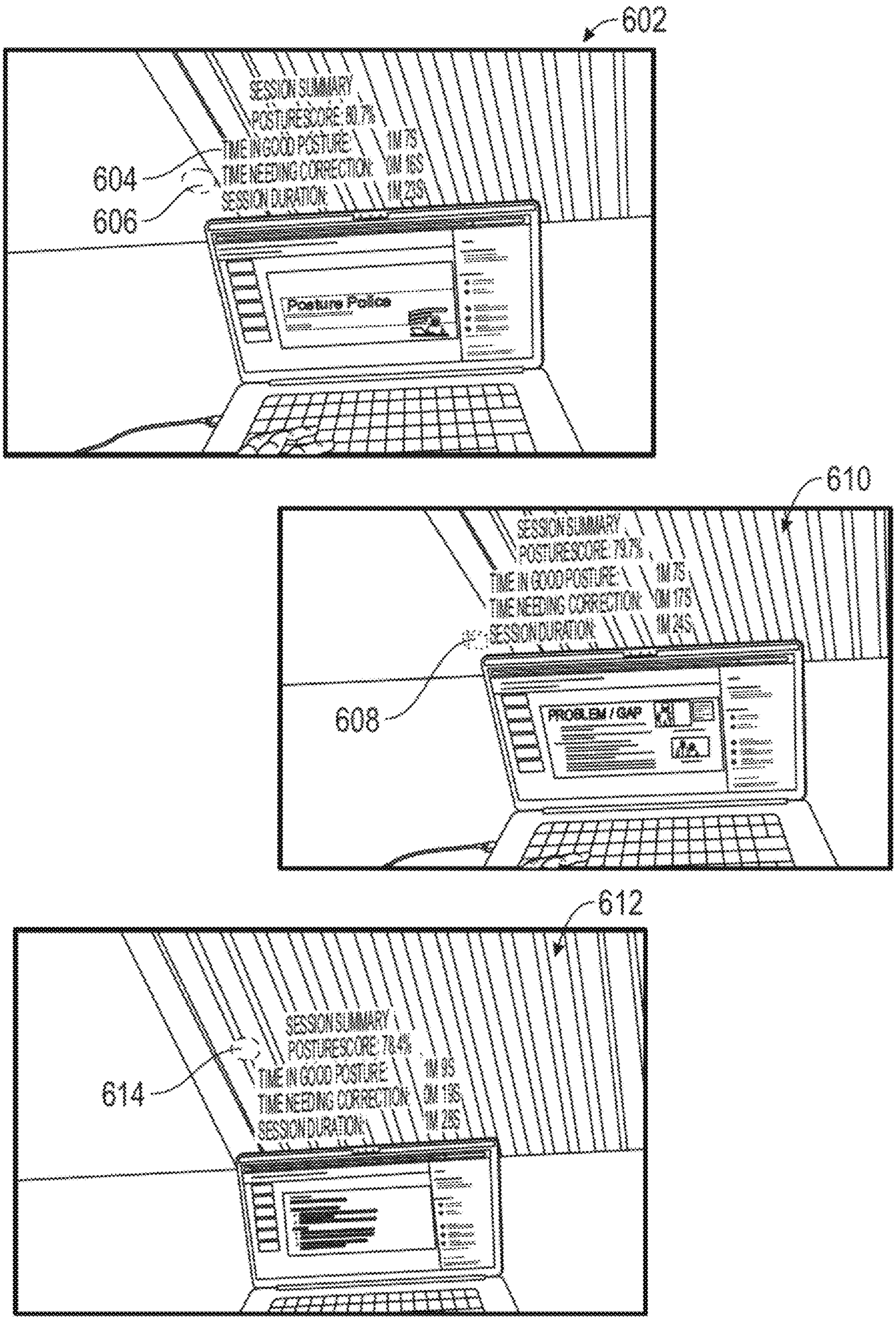
FIG. 6 are diagrams of user interfaces for generating data associated with proper posture, according to some examples.

FIG. 6 are diagrams of user interfaces for generating data associated with proper posture, according to some examples. Specifically, FIG. 6 illustrates the comprehensive posture analytics tracking and ambient visual indicator progression implemented through the coordinated operation of multiple system components within the digital interaction system 100. The diagram 602 demonstrates the initial analytics capture capabilities provided by the database server 126 and database 128, showing a posture monitoring session with a PostureScore of 80.7%, representing the baseline measurement of user posture quality during a work session. This diagram 602 showcases how the posture monitoring system processes the cumulative time periods when users maintain proper posture (e.g., 1 minute 7 seconds), calculates time periods requiring posture correction (e.g., 16 seconds), and measures total session duration (e.g., 1 minute 23 seconds) to compute comprehensive posture quality posture metrics 604.

The posture metrics 604 displayed in the upper portion of diagram 602 represent the core data collection and processing capabilities implemented through the user management system 218 and database storage architecture. These posture metrics 604 demonstrate how the system tracks cumulative time periods when users maintain proper posture, measures total session duration for posture monitoring activities, and calculates time periods associated with improper posture based on deviation events corresponding to head position deviating from the reference position by more than predetermined thresholds. The PostureScore calculation of 80.7% represents the percentage of proper posture time relative to total session time, with the stored data comprising the cumulative time periods, total session duration, and time periods associated with improper posture, enabling comprehensive analytics reporting and trend analysis over time.

The ambient visual indicator that can have a first visual attribute 606 corresponds to a state (e.g., initial state) of the geometric shape-based feedback system implemented through the digital effect system 206 and digital effect creation system 214. The ambient visual indicator that can have a first visual attribute 606 represents the optimal posture feedback state, such as displayed as a green circle when users maintain proper posture, positioned in the user's peripheral vision to avoid interfering with their primary work activities. The visual indicator system operates through coordinated mapping of posture deviation measurements to specific geometric transformations, enabling real-time feedback about posture quality while maintaining the ambient nature of the notification system.

For example, the operations for measuring distance from the calibration point begin with the posture monitoring system continuously monitoring the current position of the AR wearable device relative to the established calibration point to detect when the user's head position deviates from the reference position. The posture monitoring system performs real-time three-dimensional coordinate tracking by capturing the current XYZ position coordinates of the AR wearable device in world space and computing the Euclidean distance between the current position and the stored calibration point coordinates. For example, if the calibration point is established at coordinates (0, 1.62, 0.12) and the current AR glasses position is detected at (0, 1.50, 0.08), the posture monitoring system calculates the three-dimensional distance using the formula: $\text{distance}=\sqrt{[(x_2-x_1)^2+(y_2-y_1)^2+(z_2-z_1)^2]}$, resulting in a measured deviation of approximately 0.123 meters from the calibration reference.

The posture monitoring system implements specialized vertical displacement monitoring as a primary indicator of slouching behavior by tracking the Y-axis coordinate changes relative to the calibration point. When the vertical displacement exceeds predetermined downward thresholds indicating improper posture, the digital effect system 206 triggers the geometric transformation sequence for the ambient visual indicator. The operations classify posture deviations into severity categories including slight, moderate, and severe deviations by analyzing severity levels through measuring the total distance of the current position of the AR wearable device from the calibration point and determining notification timing based on the analyzed severity levels. For instance, when the measured distance falls within 0.05-0.08 meters from the calibration point, the posture monitoring system maintains the ambient visual indicator that can have a first visual attribute 606 as a green circle, but when the distance exceeds 0.08 meters, the posture monitoring system initiates the geometric transformation toward intermediate visual states, and when the distance surpasses 0.15 meters, the posture monitoring system completes the transformation to display alternative visual attributes indicating the need for posture correction.

The coordinated mapping operations implemented through the digital effect creation system 214 enable the posture monitoring system to map the calculated measure of deviation to specific geometric transformations of the ambient visual indicator, executing smooth transitions between geometric states over predetermined time intervals while maintaining the peripheral positioning that preserves the user's ability to focus on primary work activities. This technical approach ensures that the ambient visual indicator has ambient visual indicator that can have a first visual attribute 606 that serves as an accurate, real-time representation of optimal posture maintenance based on precise distance measurements from the established calibration reference point.

The transition shown in the diagram 610 from diagram 602 illustrates the dynamic progression of the posture monitoring system as users experience gradual posture degradation over time. This diagram 610 demonstrates how the posture monitoring system continuously analyzes severity levels of posture deviation by measuring the distance of the current position of the AR wearable device from the calibration point, resulting in updated posture metrics 604 showing a decreased PostureScore of 79.7%. The increased time needing correction (e.g., 17 seconds) and extended session duration (e.g., 1 minute 24 seconds) reflect the system's ability to detect and track progressive posture deterioration while maintaining continuous data collection through the database server 126.

The ambient visual indicator has a second visual attribute 608 that represents the intermediate state of the geometric transformation system as posture quality begins to degrade based on the measure of deviation between the user's head position and the reference position. This ambient visual indicator having a second visual attribute 608 that demonstrates the smooth transition capabilities implemented through the digital effect system 206, where the ambient visual indicator transitions from the first visual attribute toward more noticeable visual states, such as changing color saturation or initiating subtle geometric morphing while maintaining predominantly circular characteristics, shown in the ambient visual indicator that can have a second visual attribute 608 and/or the ambient visual indicator that can have a third visual attributes 614. The posture monitoring system executes these smooth transitions between geometric states over predetermined time intervals, providing users with progressive visual feedback that correlates directly with their measured posture deviation levels.

The diagram 612 illustrates the continued progression of posture deterioration and the corresponding system response through enhanced visual feedback and updated analytics including the ambient visual indicator that can have a third visual attribute 614. This diagram 612 shows the Posture-Score further declining to 78.4%, with increased time needing correction (e.g., 19 seconds) and extended total session duration (e.g., 1 minute 28 seconds), demonstrating the system's ability to track long-term posture degradation patterns. The analytics progression shown across all three diagrams enables the generation of detailed analytics reports containing posture metrics and trends over time, supporting the identification of patterns in posture degradation for personalized insights provided to users through the comprehensive data processing capabilities.

The sequential progression displayed in the diagrams 602, 610, and 612 demonstrates how the messaging system 210 within the communication system 208 coordinates the delivery of increasingly urgent posture-related notifications based on the analyzed severity levels and duration of poor posture. The posture monitoring system implements dynamic notification timing, where slight deviations may be monitored over extended periods before triggering alerts, while more severe deviations as indicated by the declining posture scores would prompt more immediate intervention through the ambient visual indicator system. This progressive notification approach ensures that users receive appropriately timed feedback while avoiding notification fatigue during extended work sessions.

The analytics data structure shown across diagrams 602, 610, and 612 supports the broader health platform integration goals implemented through coordination between multiple subsystems within the digital interaction system 100. The consistent tracking of posture metrics enables the game system 224 to incorporate posture monitoring into gamification features, the external resource system 226 to share data with third-party health applications, and the user management system 218 to maintain comprehensive user health profiles. The progressive degradation pattern also supports the implementation of personalized interventions, such as the twenty-twenty-twenty rule reminders and stand-up notifications when prolonged poor posture periods are detected.

The comprehensive data visualization approach demonstrated in these diagrams 602, 610, and 612 enables users to understand their posture improvement journey through clear, quantifiable metrics that can be processed by the posture monitoring system to provide personalized insights and recommendations. The declining posture scores from 80.7% to 78.4% across the session progression illustrate how the system can identify concerning trends that may warrant adjusted calibration parameters, modified notification timing, or additional health platform interventions. This data-driven approach supports the continuous refinement of posture detection algorithms based on user feedback and correction responses, enabling the system to adapt notification sensitivity and timing patterns for optimal user experience and posture improvement outcomes.

The integration of quantitative posture metrics with ambient visual feedback (including the ambient visual indicator that can have a first visual attribute 606, the ambient visual indicator that can have a second visual attribute 608, and/or the ambient visual indicator that can have a third visual attribute 614) shown throughout FIG. 6 represents the comprehensive approach taken by the interaction client 104 to coordinate posture monitoring functionality across all subsystems while maintaining seamless integration with users' daily work activities. The progressive analytics tracking enables the implementation of reward-based feature unlocking mechanisms where maintaining posture scores above predetermined thresholds for specified time periods could grant users access to enhanced features within the messaging application and broader digital interaction system 100, creating continuous incentives for maintaining proper posture habits while providing valuable biometric data for long-term health analysis and improvement.

In some cases, the animation system operates bidirectionally to provide continuous visual feedback as users improve their posture and move closer to the calibration point established during the initial setup process. When users respond to posture notifications and begin correcting their slouching behavior, the ambient visual indicator smoothly reverses its geometric transformation sequence, transitioning from the degraded visual state back through the same intermediate visual states toward the optimal state. As illustrated in the progression shown across diagrams 602, 610, and 612, when the posture monitoring system detects that the current position of the AR wearable device is moving closer to the reference calibration point, the digital effect system 206 executes the reverse geometric transformations over predetermined time intervals. The ambient visual indicator that can have a second visual attribute 608 that progressively transitions back toward the ambient visual indicator that can have a first visual attribute 606, with the degraded visual form gradually softening its characteristics, the color shifting from warning hues back toward optimal colors, and the overall shape progressively morphing back to the optimal geometric form. This reverse transition is reflected in the posture metrics 604, where users can observe their Posture-Score improving and their time in good posture increasing as shown in the sequential progression of diagrams 602, 610, and 612, providing immediate positive reinforcement when they correct their posture and confirming that they have successfully restored proper head positioning relative to the calibration point, which can encourage continued adherence to ergonomic working postures and creating a continuous feedback loop that supports long-term posture improvement habits.

Figure 7:
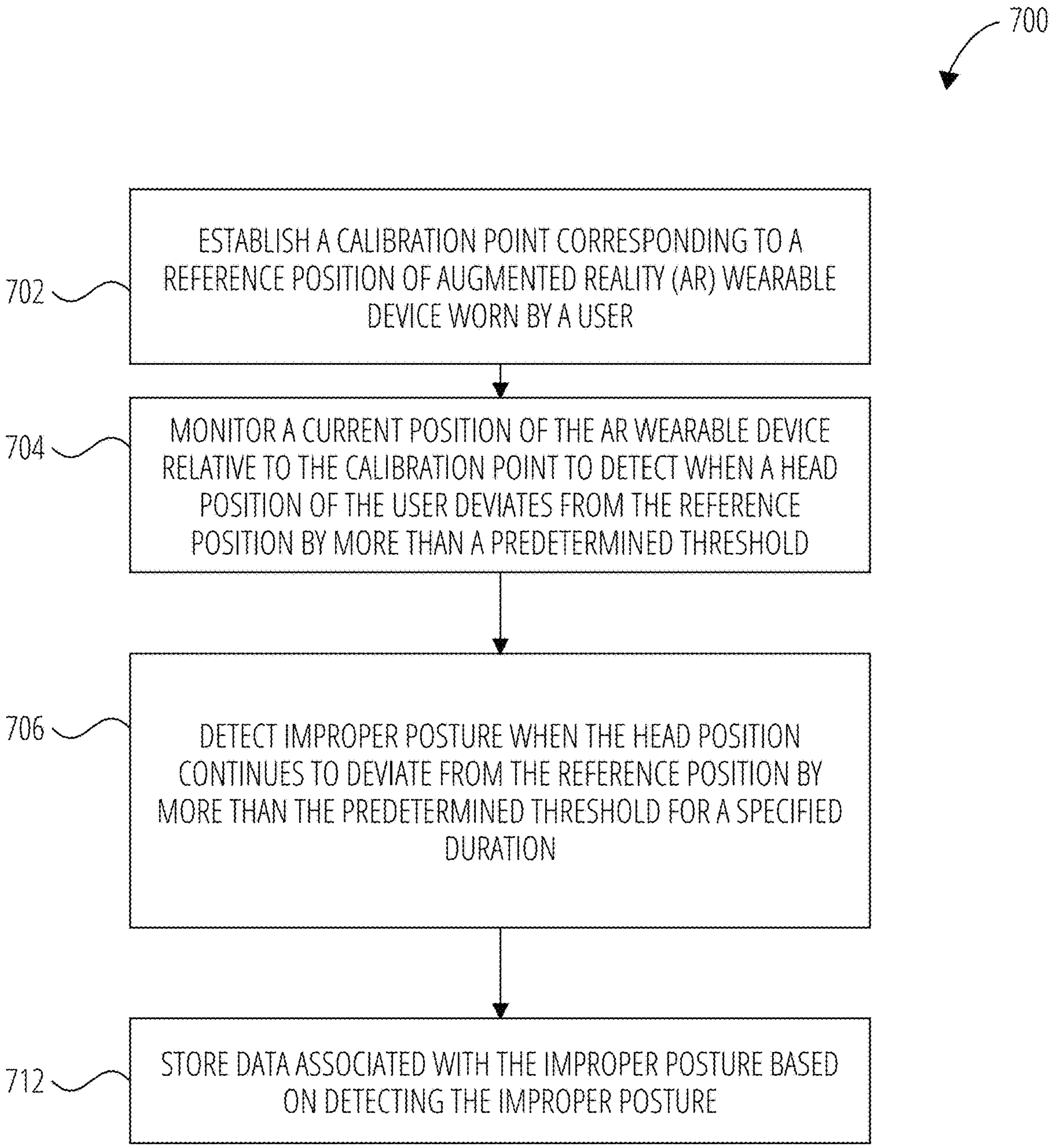
FIG. 7 illustrates a method performed by the digital effect presentation system, in accordance with some examples.

FIG. 7 illustrates a method 700 (or process) performed by the digital effect presentation system and/or posture monitoring system, in accordance with some examples. The method 700 may optionally include one or more additional operations. The operations of method 700 may be performed in a different order. One or more of the operations of method 700 may be optional.

The method 700 can perform various operations. For example, in operation 702, the posture monitoring system establishes a calibration point corresponding to a reference position of an AR wearable device worn by a user. The calibration point establishment process involves computing a forward vector direction from the AR wearable device, generating an inverted vector by inverting the forward vector direction by a negative value to determine a direction toward a back of the user's head, and scaling the inverted vector by a predetermined value to identify a midpoint of the user's head. This calibration approach reduces rotational differences during head movement by positioning the calibration point at or near the midpoint of the user's head, which remains relatively stable regardless of natural head rotation and movement. The posture monitoring system may also display visual guidance showing proper posture positioning to users during calibration processes, enabling manual calibration input when users are positioned in proper posture.

In operation 704, the posture monitoring system monitors a current position of the AR wearable device relative to the calibration point to detect when a head position of the user deviates from the reference position by more than a predetermined threshold. The monitoring includes tracking vertical displacement of the AR wearable device relative to the calibration point and detecting when displacement exceeds downward thresholds indicating improper posture such as slouching. The posture monitoring system continuously captures the current XYZ position coordinates of the AR wearable device in world space and computes the Euclidean distance between the current position and the stored calibration point coordinates. The posture monitoring system analyzes severity levels of posture deviation by measuring the distance of the current position of the AR wearable device from the calibration point.

In operation 706, the posture monitoring system detects improper posture when the head position continues to deviate from the reference position by more than the predetermined threshold for a specified duration. The posture monitoring system classifies posture deviations into severity categories including slight, moderate, and severe deviations, with different notification timing based on the analyzed severity levels. For slight deviations, the posture monitoring system may assign notification delay timers of longer durations, while severe deviations trigger more immediate detection and response. The posture monitoring system may also generate and display ambient visual indicators comprising geometric shapes that change form based on posture quality, transitioning from a first visual attribute when users maintain proper posture toward a second visual attribute as posture begins to degrade.

In operation 712, the posture monitoring system stores data (e.g., posture metrics) associated with the improper posture based on detecting the improper posture. The database server 126 and database 128 store comprehensive posture analytics data including cumulative time periods when users maintain proper posture, total session durations for posture monitoring activities, and time periods requiring posture correction. The stored data enables computation of posture quality scores as percentages of proper posture time relative to total session time, supporting generation of detailed analytics reports containing posture metrics and trends over time. This data processing capability allows for comprehensive tracking of user progress and identification of patterns in posture degradation for personalized insights provided through the user management system 218.

As referred to herein, proper posture refers to an optimal biomechanical alignment of the user's head, neck, and torso during work or daily activities while wearing the AR wearable device, characterized by a reference position where the user maintains an upright back, forward-facing head orientation at an appropriate height relative to their work surface, and shoulders positioned in natural alignment, which serves as the calibration point for the posture monitoring system and represents the user's most comfortable and ergonomically sound working position that minimizes strain on the musculoskeletal system. This reference position is established through either manual calibration where the user consciously positions themselves in their optimal working posture, or through automated detection algorithms that identify when the user naturally maintains a stable, ergonomically appropriate position for extended periods during typical work activities. Proper posture is measured by the AR wearable device's position in 3D space relative to the established calibration point, with deviations beyond predetermined thresholds in any direction, particularly downward head movement, forward head positioning, or lateral tilting, indicating departure from proper posture and potential slouching or other postural misalignment that may lead to musculoskeletal strain or discomfort over time.

The disclosed techniques address these and other challenges by providing an unintrusive, integrated posture monitoring solution that leverages augmented reality wearable devices users already wear for other purposes, eliminating the need for dedicated posture correction hardware. Improper posture refers to any deviation of the user's head, neck, and torso alignment from the optimal biomechanical working position, including slouching characterized by forward head positioning where the head drops significantly below the established reference point for more than a specified period of time, hunching over where the body curves forward from the natural upright alignment, excessive downward head movement that places strain on the cervical spine, or any sustained positioning that deviates from the user's calibrated proper working posture for more than a predetermined threshold distance and duration. The system detects improper posture by monitoring when the user's head position continues to deviate from the reference position by more than the predetermined threshold for a specified duration, capturing common poor posture behaviors such as leaning too far forward toward a computer screen, allowing the shoulders to roll forward, or maintaining a head-down position that compromises the natural curve of the spine during extended work sessions.

System with Head-Wearable Apparatus

Figure 8:
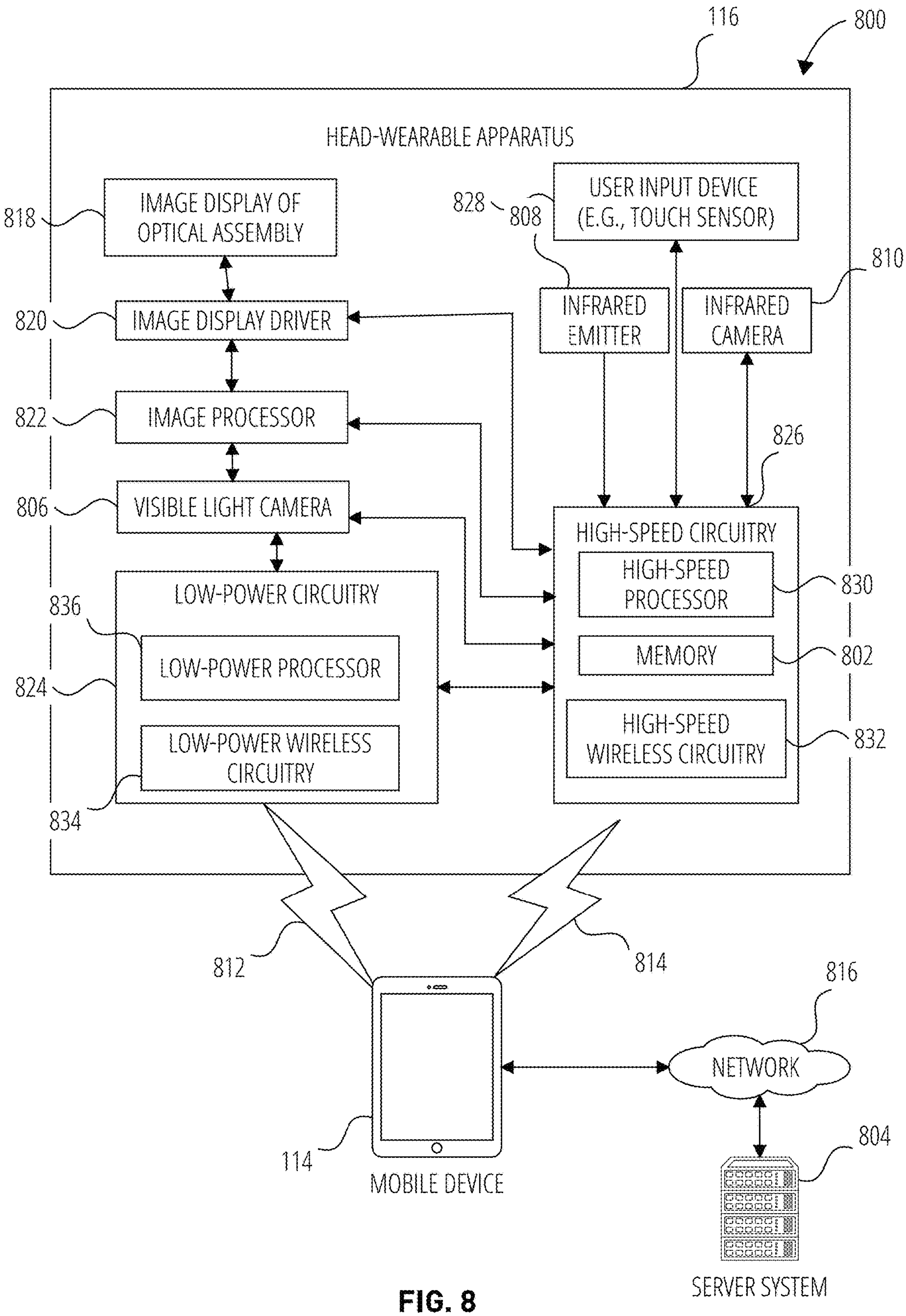
FIG. 8 illustrates a system in which the head-wearable apparatus can be implemented, according to some examples.

FIG. 8 illustrates a system 800 including a head-wearable apparatus 116 with a selector input device, according to some examples. FIG. 8 is a high-level functional block diagram of an example head-wearable apparatus 116 communicatively coupled to a mobile device 114 and various server systems 804 (e.g., the server system 110) via various networks 816.

The head-wearable apparatus 116 includes one or more cameras, each of which may be, for example, a visible light camera 806, an infrared emitter 808, and an infrared camera 810. In some cases, the head-wearable apparatus 116 includes a digital effect display component including the image display of optical assembly 818 or other digital effect presentation systems.

The mobile device 114 connects with head-wearable apparatus 116 using both a low-power wireless connection 812 and a high-speed wireless connection 814. The mobile device 114 is also connected to the server system 804 and the Network 816.

The head-wearable apparatus 116 further includes two image displays of the image display of optical assembly 818. The two image displays of optical assembly 818 include one associated with the left lateral side and one associated with the right lateral side of the head-wearable apparatus 116. The head-wearable apparatus 116 also includes an image display driver 820, an image processor 822, low-power circuitry 824, and high-speed circuitry 826. The image display of optical assembly 818 is for presenting images and videos, including an image that can include a graphical user interface to a user of the head-wearable apparatus 116.

The image display driver 820 commands and controls the image display of optical assembly 818. The image display driver 820 may deliver image data directly to the image display of optical assembly 818 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 828 (e.g., touch sensor or push button), including an input surface on the head-wearable apparatus 116. The user input device 828 (e.g., touch sensor or push button) is to receive from the user an input selection to manipulate the graphical user interface of the presented image.

The components shown in FIG. 8 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 806 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 802, which stores instructions to perform a subset, or all the functions described herein. The memory 802 can also include a storage device.

As shown in FIG. 8, the high-speed circuitry 826 includes a high-speed processor 830, a memory 802, and high-speed wireless circuitry 832. In some examples, the image display driver 820 is coupled to the high-speed circuitry 826 and operated by the high-speed processor 830 to drive the left and right image displays of the image display of optical assembly 818. The high-speed processor 830 may be any processor capable of managing high-speed communications and operation of any general computing system needed for the head-wearable apparatus 116. The high-speed processor 830 includes processing resources needed for managing high-speed data transfers on a high-speed wireless connection 814 to a wireless local area network (WLAN) using the high-speed wireless circuitry 832. In certain examples, the high-speed processor 830 executes an operating system such as a LINUX operating system or other such operating system of the head-wearable apparatus 116, and the operating system is stored in the memory 802 for execution. In addition to any other responsibilities, the high-speed processor 830 executing a software architecture for the head-wearable apparatus 116 is used to manage data transfers with high-speed wireless circuitry 832. In certain examples, the high-speed wireless circuitry 832 is configured to implement Institute of Electrical and Electronic Engineers (IEEE) 802.11 communication standards, also referred to herein as WI-FIR. In some examples, other high-speed communications standards may be implemented by the high-speed wireless circuitry 832.

The low-power wireless circuitry 834 and the high-speed wireless circuitry 832 of the head-wearable apparatus 116 can include short-range transceivers (e.g., Bluetooth™, Bluetooth LE, Zigbee, ANT+) and wireless wide, local, or wide area Network transceivers (e.g., cellular or WI-FI®). Mobile device 114, including the transceivers communicating via the low-power wireless connection 812 and the high-speed wireless connection 814, may be implemented using details of the architecture of the head-wearable apparatus 116, as can other elements of the Network 816.

The memory 802 includes any storage device capable of storing various data and applications, including, among other things, camera data generated by the left and right visible light cameras 806, the infrared camera 810, and the image processor 822, as well as images generated for display by the image display driver 820 on the image displays of the image display of optical assembly 818. While the memory 802 is shown as integrated with high-speed circuitry 826, in some examples, the memory 802 may be an independent standalone element of the head-wearable apparatus 116. In certain such examples, electrical routing lines may provide a connection through a chip that includes the high-speed processor 830 from the image processor 822 or the low-power processor 836 to the memory 802. In some examples, the high-speed processor 830 may manage addressing of the memory 802 such that the low-power processor 836 will boot the high-speed processor 830 any time that a read or write operation involving memory 802 is needed.

As shown in FIG. 8, the low-power processor 836 or high-speed processor 830 of the head-wearable apparatus 116 can be coupled to the camera (visible light camera 806, infrared emitter 808, or infrared camera 810), the image display driver 820, the user input device 828 (e.g., touch sensor or push button), and the memory 802.

The head-wearable apparatus 116 is connected to a host computer. For example, the head-wearable apparatus 116 is paired with the mobile device 114 via the high-speed wireless connection 814 or connected to the server system 804 via the Network 816. The server system 804 may be one or more computing devices as part of a service or network computing system, for example, that includes a processor, a memory, and network communication interface to communicate over the Network 816 with the mobile device 114 and the head-wearable apparatus 116.

The mobile device 114 includes a processor and a Network communication interface coupled to the processor. The Network communication interface allows for communication over the Network 816, low-power wireless connection 812, or high-speed wireless connection 814. Mobile device 114 can further store at least portions of the instructions in the memory of the mobile device 114 memory to implement the functionality described herein.

Output components of the head-wearable apparatus 116 include visual components, such as a liquid crystal display (LCD), a plasma display panel (PDP), a light-emitting diode (LED) display, a projector, or a waveguide. The image displays of the optical assembly are driven by the image display driver 820. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 804, such as the user input device 828, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include sensors and display elements integrated with the head-wearable apparatus 116. For example, peripheral device elements may include any I/O components including output components, motion components, position components, or any other such elements described herein.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 812 and high-speed wireless connection 814 from the mobile device 114 via the low-power wireless circuitry 834 or high-speed wireless circuitry 832.

Machine Architecture

Figure 9:
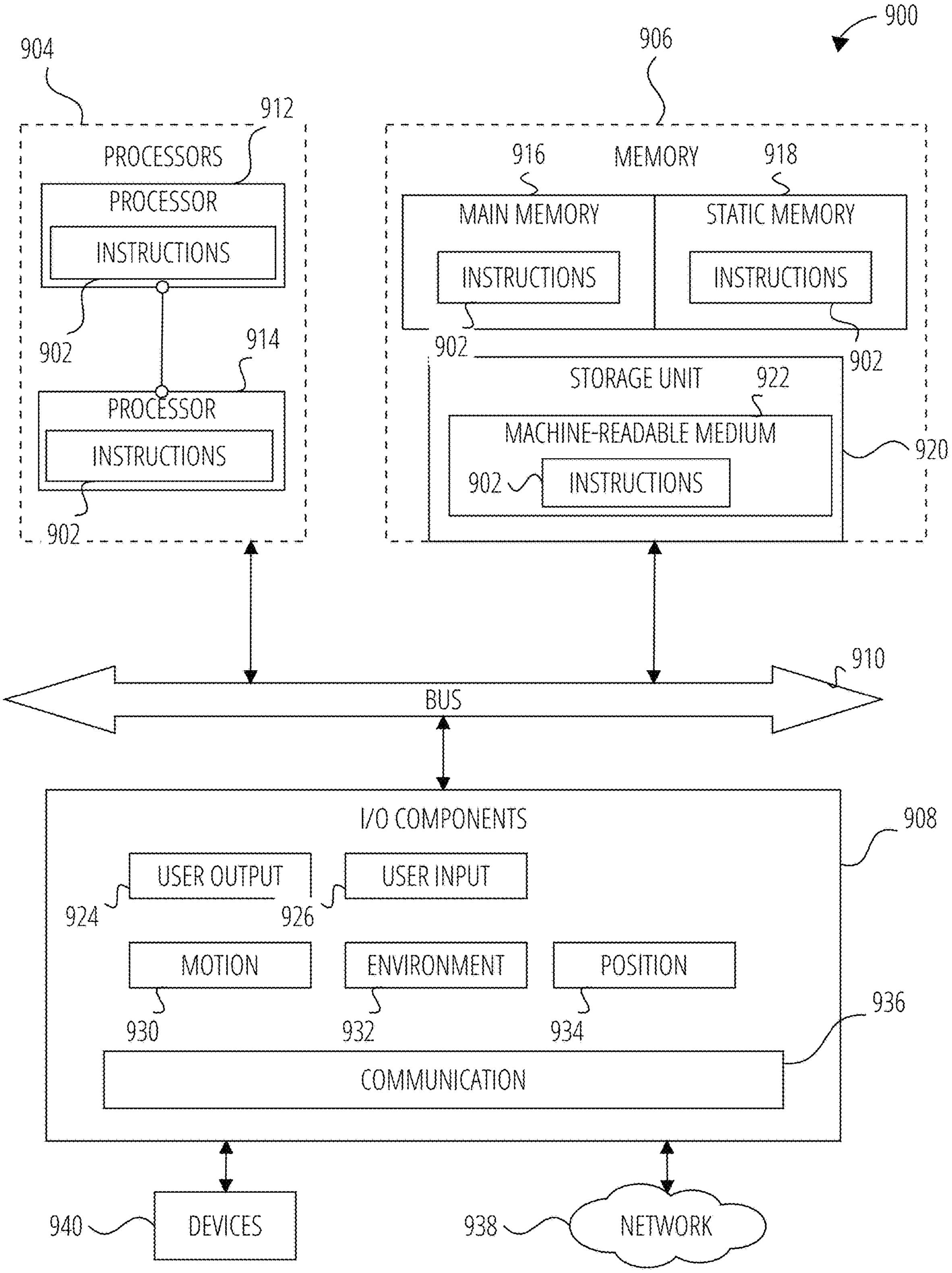
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the server system 110. In some examples, the machine 900 may also comprise both client and server systems, with certain operations of a particular method or algorithm being performed on the server-side and with certain operations of the method or algorithm being performed on the client-side.

The machine 900 may include processors 904, processor 912, processor 914, memory 906, and input/output I/O components 908, which may be configured to communicate with each other via a bus 910.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924, position components 934, and user input components 926. The user output components 924 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The motion components 930 include acceleration sensor components (e.g., accelerometer), gravitation sensor components, and rotation sensor components (e.g., gyroscope).

The environmental components 932 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be modified with digital effect data (e.g., filters) described above. The rear cameras may, for example, be used to capture still images and videos in a more traditional camera mode, with these images similarly being modified with digital effect data. In addition to front and rear cameras, the user system 102 may also include a 360° camera for capturing 360° photographs and videos.

Moreover, the camera system of the user system 102 may be equipped with advanced multi-camera configurations. This may include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 102 may also feature triple, quad, or even penta camera configurations on both the front and rear sides of the user system 102. These multiple cameras systems may include a wide camera, an ultra-wide camera, a telephoto camera, a macro camera, and a depth sensor, for example.

Communication may be implemented using a wide variety of technologies. The I/O components 908 further include communication components 936 operable to couple the machine 900 to a Network 938 or devices 940 via respective coupling or connections. For example, the communication components 936 may include a network interface component or another suitable device to interface with the Network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the Network 938, using a transmission medium, via a network interface device (e.g., a network interface component included in the communication components 936) and using any one of several well-known transfer protocols (e.g., hypertext transfer protocol [HTTP]). Similarly, the instructions 902 may be transmitted or received using a transmission medium via a coupling (e.g., a peer-to-peer coupling) to the devices 940.

Software Architecture

Figure 10:
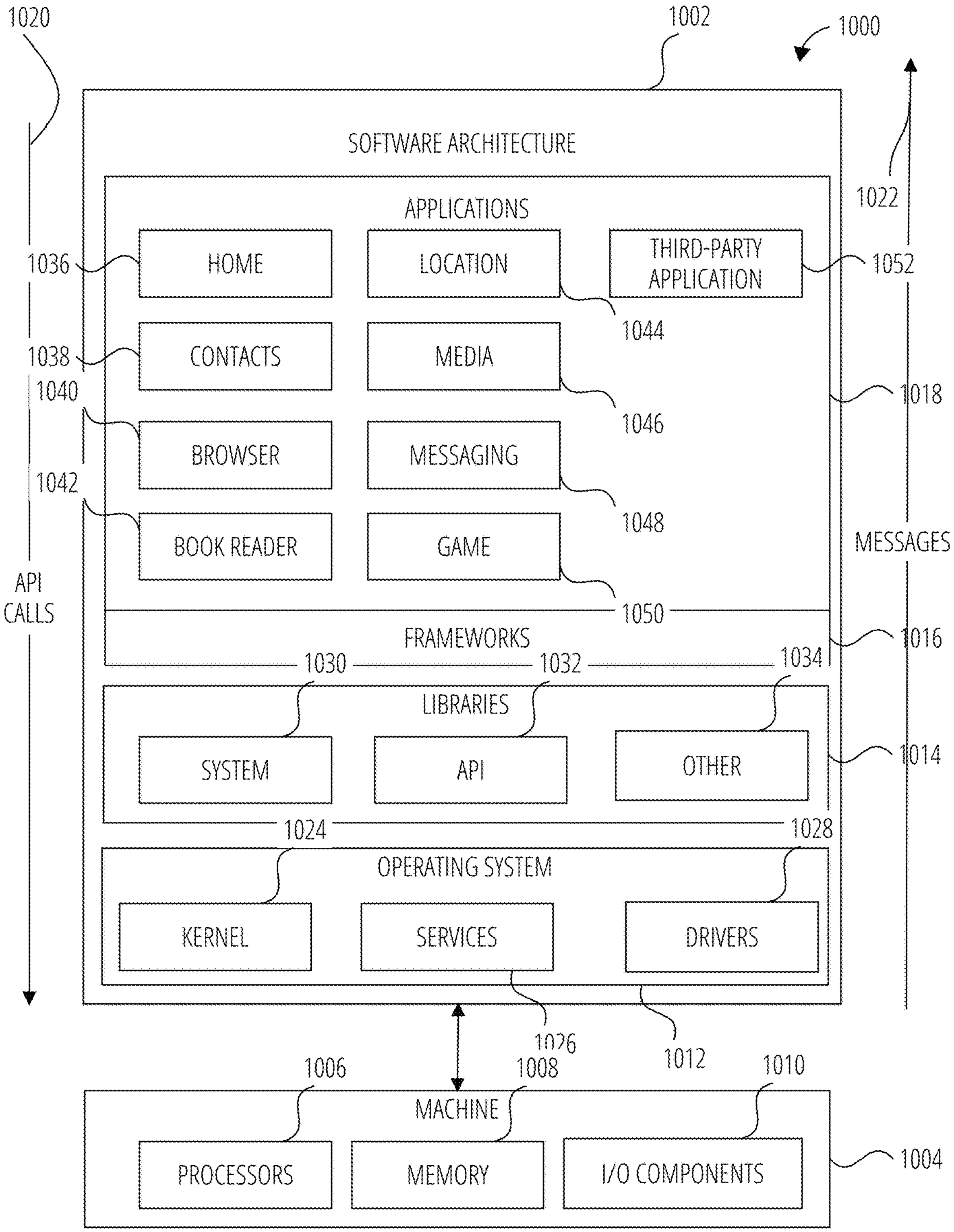
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes Processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematical functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of a platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number may also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

The various features, operations, or processes described herein may be used independently of one another, or may be combined in various ways. All possible combinations and sub-combinations are intended to fall within the scope of this disclosure. In addition, certain method or process blocks may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

EXAMPLE STATEMENTS

In view of the disclosure above, various examples are set forth below. It should be noted that one or more features of an example, taken in isolation or combination, should be considered within the disclosure of this application.

Example 1: A system comprising: at least one processor; and at least one memory component storing instructions that, when executed by the at least one processor, cause the at least one processor to perform operations comprising: establishing a calibration point corresponding to a reference position of augmented reality (AR) wearable device worn by a user; monitoring a current position of the AR wearable device relative to the calibration point to detect when a head position of the user deviates from the reference position by more than a predetermined threshold; detecting improper posture when the head position continues to deviate from the reference position by more than the predetermined threshold for a specified duration; and storing data associated with the improper posture based on detecting the improper posture.

Example 2: The system of Example 1, wherein the operations comprise: computing a forward vector direction from the AR wearable device; generating an inverted vector by inverting the forward vector direction by a negative value to determine a direction toward a back of a head of the user; scaling the inverted vector by a predetermined value to identify a midpoint of the head of the user; and positioning the calibration point at the midpoint of the head of the user reducing rotational differences during head movement.

Example 3: The system of any one of Examples 1-2, wherein the operations comprise: monitoring vertical displacement of the AR wearable device relative to the calibration point; detecting when the vertical displacement exceeds a downward threshold indicating the improper posture; and triggering the improper posture detection when the downward displacement persists beyond the specified duration.

Example 4: The system of any one of Examples 1-3, wherein the operations comprise: displaying visual guidance showing proper posture positioning to the user; receiving a manual calibration input from the user when positioned in the proper posture; capturing a three-dimensional (3D) position coordinate of the AR wearable device upon receiving the manual calibration input; and storing the 3D position coordinate as the calibration point for subsequent posture monitoring.

Example 5: The system of Example 4, wherein the operations comprise: displaying a hand icon with a calibration indicator within a field of view of the AR wearable device to guide user interaction; monitoring the field of view to detect when the user performs a specified hand gesture within a predetermined detection zone; recognizing the specified hand gesture through visual tracking systems integrated with the AR wearable device; and presenting a calibration menu interface comprising an option associated with the manual calibration input in response to detecting the specified hand gesture, the calibration menu interface allowing the user to initiate a calibration process.

Example 6: The system of any one of Examples 4-5, wherein the operations comprise: detecting when the user is in a seated position through pose detection; and automatically retrieving the calibration point to detect improper posture for the seated position in response to detecting that the user is in the seated position.

Example 7: The system of Example 6, wherein the operations comprise: storing multiple calibration points each associated with a different resting pose of a plurality of resting poses of the user, the seated position comprising individual resting pose of the plurality of resting poses, the plurality of resting poses comprising sitting, standing, or reclining; and retrieving the calibration point from the multiple calibration points that is associated with the individual resting pose.

Example 8: The system of any one of Examples 1-7, wherein the operations comprise: generating an ambient visual indicator comprising a geometric shape that changes form based on posture quality; displaying the ambient visual indicator having a first visual attribute when the user maintains proper posture; transitioning the ambient visual indicator from the first visual attribute toward a second visual attribute as proper posture begins to degrade based a measure of deviation between the head position of the user and the reference position; and positioning the ambient visual indicator in a peripheral vision of the user.

Example 9: The system of Example 8, wherein the first visual attribute comprises at least one of a first size or first color, and wherein the second visual attribute comprises at least one of a second size or second color.

Example 10: The system of any one of Examples 8-9, wherein the operations comprise: calculating the measure of deviation based on deviation magnitude from the calibration point; mapping the measure of deviation to specific geometric transformations of the ambient visual indicator; and executing smooth transitions between geometric states of the ambient visual indicator over predetermined time intervals.

Example 11: The system of any one of Examples 8-10, wherein the operations comprise: analyzing severity level of posture deviation by measuring distance of the current position of the AR wearable device from the calibration point; determining notification timing for the ambient visual indicator based on the severity level; immediately presenting the ambient visual indicator when the severity level transgresses a threshold; and delaying presentation of the ambient visual indicator when the severity level fails to transgress the threshold over a particular duration.

Example 12: The system of Example 11, wherein the operations comprise: classifying posture deviations into severity categories including slight, moderate, and severe; assigning notification delay timers of a first value for slight deviations; and assigning notification delay timers of a second value smaller than the first value for severe deviations.

Example 13: The system of any one of Examples 1-12, wherein the operations comprise: tracking cumulative time periods when the user maintains proper posture; measuring total session duration for posture monitoring activities; calculating time periods associated with improper posture based on deviation events corresponding to the head position of the user deviating from the reference position by more than the predetermined threshold; and computing a posture quality score as a percentage of the cumulative time periods relative to the total session duration, the stored data comprising at least one of the cumulative time periods, the total session duration, the time periods associated with improper posture, or the posture quality score.

Example 14: The system of Example 13, wherein the operations comprise: generating detailed analytics reports containing posture metrics and trends over time; storing historical posture data for long-term analysis; processing the stored data to identify patterns in posture degradation; and providing personalized insights to the user based on the identified patterns.

Example 15: The system of any one of Examples 1-14, wherein the operations comprise: providing user configuration settings for enabling or disabling data collection associated with the improper posture; implementing notification toggle controls allowing users to disable posture alerts while maintaining data collection; continuing background posture monitoring and data storage when notifications are disabled; and generating periodic posture reports accessible to users regardless of notification settings.

Example 16: The system of any one of Examples 1-15, wherein the operations comprise: implementing rule reminders for eye strain reduction; generating stand-up reminders when prolonged sitting periods are detected; and providing hydration notifications at predetermined intervals.

Example 17: The system of any one of Examples 1-16, wherein the operations comprise: collecting posture data samples from multiple users across diverse demographic groups and working environments; labeling the collected posture data samples with corresponding posture quality classifications and user correction responses; training a neural network model using supervised learning techniques on the labeled collected posture data samples to recognize patterns indicative of improper posture.

Example 18: The system of any one of Examples 1-17, wherein the AR wearable device comprises AR glasses, and wherein the improper posture is associated with slouching.

Example 19: A method comprising: establishing a calibration point corresponding to a reference position of augmented reality (AR) wearable device worn by a user; monitoring a current position of the AR wearable device relative to the calibration point to detect when a head position of the user deviates from the reference position by more than a predetermined threshold; detecting improper posture when the head position continues to deviate from the reference position by more than the predetermined threshold for a specified duration; and storing data associated with the improper posture based on detecting the improper posture.

Example 20: A non-transitory computer-readable storage medium storing instructions that, when executed by at least one processor, cause the at least one processor to perform operations comprising: establishing a calibration point corresponding to a reference position of augmented reality (AR) wearable device worn by a user; monitoring a current position of the AR wearable device relative to the calibration point to detect when a head position of the user deviates from the reference position by more than a predetermined threshold; detecting improper posture when the head position continues to deviate from the reference position by more than the predetermined threshold for a specified duration; and storing data associated with the improper posture based on detecting the improper posture.

TERM EXAMPLES

"Carrier signal" may include, for example, any intangible medium that can store, encoding, or carrying instructions for execution by the machine and includes digital or analog communications signals or other intangible media to facilitate communication of such instructions. Instructions may be transmitted or received over a network using a transmission medium via a network interface device.

"Client device" may include, for example, any machine that interfaces to a network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Component" may include, for example, a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" may refer to a hardware component implemented using one or more processors. Similarly, the methods described herein may be at least partially Processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" may include, for example, both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" may include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine storage medium may also refer to cloud storage services, Network Attached Storage (NAS), Storage Area Networks (SAN), and object storage devices. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Network" may include, for example, one or more portions of a network that may be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5G™ network, a wireless network, a Wi-Fi® network, a Wi-Fi 6® network, a Li-Fi network, a Zigbee® network, a Bluetooth® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable storage medium" may include, for example, a tangible medium that is capable of storing, encoding, or carrying the instructions for execution by a machine.

"Processor" may include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" may include multi-core processors that may comprise two or more independent processors (sometimes referred to as "cores") that may execute instructions contemporaneously. These cores can be homogeneous (e.g., all cores are identical, as in multicore CPUs) or heterogeneous (e.g., cores are not identical, as in many modern GPUs and some CPUs). In addition, the term "processor" may also encompass systems with a distributed architecture, where multiple processors are interconnected to perform tasks in a coordinated manner. This includes cluster computing, grid computing, and cloud computing infrastructures. Furthermore, the processor may be embedded in a device to control specific functions of that device, such as in an embedded system, or it may be part of a larger system, such as a server in a data center. The processor may also be virtualized in a software-defined infrastructure, where the processor's functions are emulated in software.

"Signal medium" may include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" may include, for example, a device accessed, controlled or owned by a user and with which the user interacts perform an action, engagement or interaction on the user device, including an interaction with other users or computer systems.

What is claimed is:

1. A system comprising:

at least one processor; and at least one memory component storing instructions that, when executed by the at least one processor, cause the at least one processor to perform operations comprising:

establishing a calibration point corresponding to a reference position of an augmented reality (AR) wearable device worn by a user;

monitoring a current position of the AR wearable device relative to the calibration point to detect when a head position of the user deviates from the reference position by more than a predetermined threshold;

detecting improper posture when the head position continues to deviate from the reference position by more than the predetermined threshold for a specified duration; and storing data associated with the improper posture based on detecting the improper posture.

2. The system of claim 1, wherein the operations comprise:

computing a forward vector direction from the AR wearable device;

generating an inverted vector by inverting the forward vector direction by a negative value to determine a direction toward a back of a head of the user;

scaling the inverted vector by a predetermined value to identify a midpoint of the head of the user; and positioning the calibration point at the midpoint of the head of the user reducing rotational differences during head movement.

3. The system of claim 1, wherein the operations comprise:

monitoring vertical displacement of the AR wearable device relative to the calibration point;

detecting when the vertical displacement exceeds a downward threshold indicating the improper posture; and triggering the improper posture detection when downward displacement persists beyond the specified duration.

4. The system of claim 1, wherein the operations comprise:

displaying visual guidance showing proper posture positioning to the user;

receiving a manual calibration input from the user when positioned in the proper posture;

capturing a three-dimensional (3D) position coordinate of the AR wearable device upon receiving the manual calibration input; and storing the 3D position coordinate as the calibration point for subsequent posture monitoring.

5. The system of claim 4, wherein the operations comprise:

displaying a hand icon with a calibration indicator within a field of view of the AR wearable device to guide user interaction;

monitoring the field of view to detect when the user performs a specified hand gesture within a predetermined detection zone;

recognizing the specified hand gesture through visual tracking systems integrated with the AR wearable device; and presenting a calibration menu interface comprising an option associated with the manual calibration input in response to detecting the specified hand gesture, the calibration menu interface allowing the user to initiate a calibration process.

6. The system of claim 4, wherein the operations comprise:

detecting when the user is in a seated position through pose detection; and automatically retrieving the calibration point to detect improper posture for the seated position in response to detecting that the user is in the seated position.

7. The system of claim 6, wherein the operations comprise:

storing multiple calibration points each associated with a different resting pose of a plurality of resting poses of the user, the seated position comprising individual resting pose of the plurality of resting poses, the plurality of resting poses comprising sitting, standing, or reclining; and retrieving the calibration point from the multiple calibration points that is associated with the individual resting pose.

8. The system of claim 1, wherein the operations comprise:

generating an ambient visual indicator comprising a geometric shape that changes form based on posture quality;

displaying the ambient visual indicator having a first visual attribute when the user maintains proper posture;

transitioning the ambient visual indicator from the first visual attribute toward a second visual attribute as proper posture begins to degrade based a measure of deviation between the head position of the user and the reference position; and positioning the ambient visual indicator in a peripheral vision of the user.

9. The system of claim 8, wherein the first visual attribute comprises at least one of a first size or first color, and wherein the second visual attribute comprises at least one of a second size or second color.

10. The system of claim 8, wherein the operations comprise:

calculating the measure of deviation based on deviation magnitude from the calibration point;

mapping the measure of deviation to specific geometric transformations of the ambient visual indicator; and executing smooth transitions between geometric states of the ambient visual indicator over predetermined time intervals.

11. The system of claim 8, wherein the operations comprise:

analyzing severity level of posture deviation by measuring distance of the current position of the AR wearable device from the calibration point;

determining notification timing for the ambient visual indicator based on the severity level;

immediately presenting the ambient visual indicator when the severity level transgresses a threshold; and delaying presentation of the ambient visual indicator when the severity level fails to transgress the threshold over a particular duration.

12. The system of claim 11, wherein the operations comprise:

classifying posture deviations into severity categories including slight, moderate, and severe;

assigning notification delay timers of a first value for slight deviations; and assigning notification delay timers of a second value smaller than the first value for severe deviations.

13. The system of claim 1, wherein the operations comprise:

tracking cumulative time periods when the user maintains proper posture;

measuring total session duration for posture monitoring activities;

calculating time periods associated with improper posture based on deviation events corresponding to the head position of the user deviating from the reference position by more than the predetermined threshold; and computing a posture quality score as a percentage of the cumulative time periods relative to the total session duration, the stored data comprising at least one of the cumulative time periods, the total session duration, the time periods associated with improper posture, or the posture quality score.

14. The system of claim 13, wherein the operations comprise:

generating analytics reports containing posture metrics and trends over time;

storing historical posture data for long-term analysis;

processing the stored data to identify patterns in posture degradation; and providing personalized insights to the user based on the identified patterns.

15. The system of claim 1, wherein the operations comprise:

providing user configuration settings for enabling or disabling data collection associated with the improper posture;

implementing notification toggle controls allowing users to disable posture alerts while maintaining data collection;

continuing background posture monitoring and data storage when notifications are disabled; and generating periodic posture reports accessible to users regardless of notification settings.

16. The system of claim 1, wherein the operations comprise:

implementing rule reminders for eye strain reduction;

generating stand-up reminders when prolonged sitting periods are detected; and providing hydration notifications at predetermined intervals.

17. The system of claim 1, wherein the operations comprise:

collecting posture data samples from multiple users across diverse demographic groups and working environments;

labeling the collected posture data samples with corresponding posture quality classifications and user correction responses; and training a neural network model using supervised learning techniques on the labeled collected posture data samples to recognize patterns indicative of improper posture.

18. The system of claim 1, wherein the AR wearable device comprises AR glasses, and wherein the improper posture is associated with slouching.

19. A method comprising:

establishing a calibration point corresponding to a reference position of an augmented reality (AR) wearable device worn by a user;

monitoring a current position of the AR wearable device relative to the calibration point to detect when a head position of the user deviates from the reference position by more than a predetermined threshold;

detecting improper posture when the head position continues to deviate from the reference position by more than the predetermined threshold for a specified duration; and storing data associated with the improper posture based on detecting the improper posture.

20. A non-transitory computer-readable storage medium storing instructions that, when executed by at least one processor, cause the at least one processor to perform operations comprising:

establishing a calibration point corresponding to a reference position of an augmented reality (AR) wearable device worn by a user;

monitoring a current position of the AR wearable device relative to the calibration point to detect when a head position of the user deviates from the reference position by more than a predetermined threshold;

detecting improper posture when the head position continues to deviate from the reference position by more than the predetermined threshold for a specified duration; and storing data associated with the improper posture based on detecting the improper posture.

* * * * *